(12) United States Patent
Fakhar et al.

(10) Patent No.: US 12,374,886 B2
(45) Date of Patent: Jul. 29, 2025

(54) SYSTEMS AND METHODS FOR FAULT TOLERANT ENERGY MANAGEMENT SYSTEMS CONFIGURED TO MANAGE HETEROGENEOUS POWER PLANTS

(71) Applicant: Energy Vault, Inc., Westlake Village, CA (US)

(72) Inventors: Shaheen Fakhar, Herndon, VA (US); James Michael Tarlecki, Woodbridge, VA (US); Robert Jordan Toth, Leesburg, VA (US)

(73) Assignee: Energy Vault, Inc., Westlake Village, CA (US)

( * ) Notice: Subject to any disclaimer, the term of this patent is extended or adjusted under 35 U.S.C. 154(b) by 0 days.

(21) Appl. No.: 18/922,820

(22) Filed: Oct. 22, 2024

(65) Prior Publication Data
US 2025/0055277 A1    Feb. 13, 2025

Related U.S. Application Data

(63) Continuation-in-part of application No. 18/473,570, filed on Sep. 25, 2023, now Pat. No. 12,132,309.
(Continued)

(51) Int. Cl.
*G06F 30/20* (2020.01)
*H02J 3/00* (2006.01)
(Continued)

(52) U.S. Cl.
CPC .............. *H02J 3/001* (2020.01); *G06F 30/20* (2020.01); *H02J 3/40* (2013.01); *H04L 63/1433* (2013.01); *H02J 2203/20* (2020.01)

(58) Field of Classification Search
CPC .......... H02J 3/001; H02J 3/40; H02J 2203/20; G06F 30/20; H04L 63/1433
See application file for complete search history.

(56) References Cited

U.S. PATENT DOCUMENTS 11,675,878 B1    6/2023   Pandya
12,142,916 B1    11/2024  Fakhar et al.
(Continued)

FOREIGN PATENT DOCUMENTS

EP    3316261 A1    5/2018

OTHER PUBLICATIONS

Integration of an energy management tool and digital twin for coordination and control of multi-vector smart energy systems (Year: 2020).*

(Continued)

*Primary Examiner* — Yuhui R Pan
(74) *Attorney, Agent, or Firm* — Knobbe, Martens, Olson & Bear LLP

(57) ABSTRACT

Systems and methods for testing a power plant emulation are disclosed. Software for an energy management system is deployed to a computer system comprising computing devices. A model of a power plant site is deployed to a test framework. Test commands and/or use cases are injected, via the test framework to public energy management system end points. The test commands and/or use cases are used to emulate and test the model of at least the portion of the power plant site and to generate simulated operating parameter values. The generated simulated operating parameter values of the model are compared with expected values. A determination is made as to whether the model passed testing using the comparison. After determining the model passed testing, software, corresponding to at least a portion of the model, is made available for deployment to operate a physical version of the power plant site.

22 Claims, 10 Drawing Sheets

Related U.S. Application Data

(60) Provisional application No. 63/518,283, filed on Aug. 8, 2023.

(51) Int. Cl.
*H02J 3/40* (2006.01)
*H04L 9/40* (2022.01)

(56) References Cited

U.S. PATENT DOCUMENTS

| | | |
|---|---|---|
| 2005/0034023 A1 | 2/2005 | Maturana et al. |
| 2006/0056285 A1 | 3/2006 | Krajewski, III |
| 2007/0168058 A1 | 7/2007 | Kephart |
| 2009/0206841 A1 | 8/2009 | Weng |
| 2013/0131837 A1 | 5/2013 | Washington |
| 2013/0277969 A1 | 10/2013 | Nielsen |
| 2013/0328395 A1 | 12/2013 | Krizman et al. |
| 2014/0082602 A1 | 3/2014 | Mallur et al. |
| 2014/0142778 A1 | 5/2014 | Zhang |
| 2014/0277788 A1 | 9/2014 | Forbes, Jr. |
| 2015/0120077 A1 | 4/2015 | Kumazawa |
| 2015/0185716 A1* | 7/2015 | Wichmann ............... F02C 9/28 700/287 |
| 2016/0077936 A1 | 3/2016 | Tang |
| 2016/0239288 A1 | 8/2016 | Latino et al. |
| 2016/0283385 A1 | 9/2016 | Boyd et al. |
| 2017/0289248 A1 | 10/2017 | Lee |
| 2018/0225244 A1 | 8/2018 | Dorneanu |
| 2018/0246731 A1 | 8/2018 | Regmi et al. |
| 2018/0254637 A1 | 9/2018 | Abate et al. |
| 2019/0005165 A1 | 1/2019 | Meagher et al. |
| 2019/0026144 A1 | 1/2019 | Bugenhagen |
| 2019/0067939 A1 | 2/2019 | Sheng et al. |
| 2019/0109891 A1 | 4/2019 | Paruchuri et al. |
| 2019/0266297 A1 | 8/2019 | Krause |
| 2019/0332073 A1 | 10/2019 | Nasle |
| 2020/0119556 A1 | 4/2020 | Shi et al. |
| 2020/0379424 A1 | 12/2020 | Wang |
| 2021/0089008 A1* | 3/2021 | Xu ...................... H04L 67/1063 |
| 2022/0404794 A1 | 12/2022 | Pritchard |
| 2023/0111775 A1* | 4/2023 | Lee ........................ G06N 20/00 706/12 |

OTHER PUBLICATIONS

U.S. Appl. No. 18/473,579, filed Sep. 25, 2023, Fakhar et al.
U.S. Appl. No. 18/473,589, filed Sep. 25, 2023, Fakhar et al.
O'Dwyer et al., "Integration of an energy management tool and digital twin for coordination and control of multi-vector smart energy systems," from "Sustainable Cities and Society," 62 (2020), 102412, (Year: 2020).
Fosić et al., "Ensuring Continuous Operation of Critical Process of Remote Control System at the Level of Network Connectivity". In 2016 39th International Convention on Information and Communication Technology, Electronics and Microelectronics (MIPRO) May 30, 2016 (pp. 618-623).

* cited by examiner

SYSTEMS AND METHODS FOR FAULT TOLERANT ENERGY MANAGEMENT SYSTEMS CONFIGURED TO MANAGE HETEROGENEOUS POWER PLANTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to energy management systems.

Description of the Related Art

Energy management systems (EMSs) play a vital role in managing power plants. Energy management systems are platforms designed to monitor, control, and optimize energy usage, such as within power plants and utility grids.

However, conventional energy management systems often lack comprehensive monitoring, analysis, and control capabilities, and may be unable to manage heterogeneous power sources at the same plant. Further, many conventional energy management systems lack adequate security, thereby risking the secure and reliable operation of power plants. Yet further, conventional energy management systems rely on programmable logic controllers (PLCs) to provide control and automation capabilities for monitoring and managing energy-related processes. The use of PLCs often necessitates that EMS software be adapted to operation with a given PLC model.

Yet further, conventionally there are no adequate methods of ensuring a power plant site design will operate as expected when actually implemented. In addition, conventionally, site equipment drivers have to be constantly rewritten in order to accommodate new versions as well as old versions of power plant site equipment, such as programmable logic controllers.

These deficiencies may result in unreliable, expensive to maintain power plants and inefficient energy generation.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1:
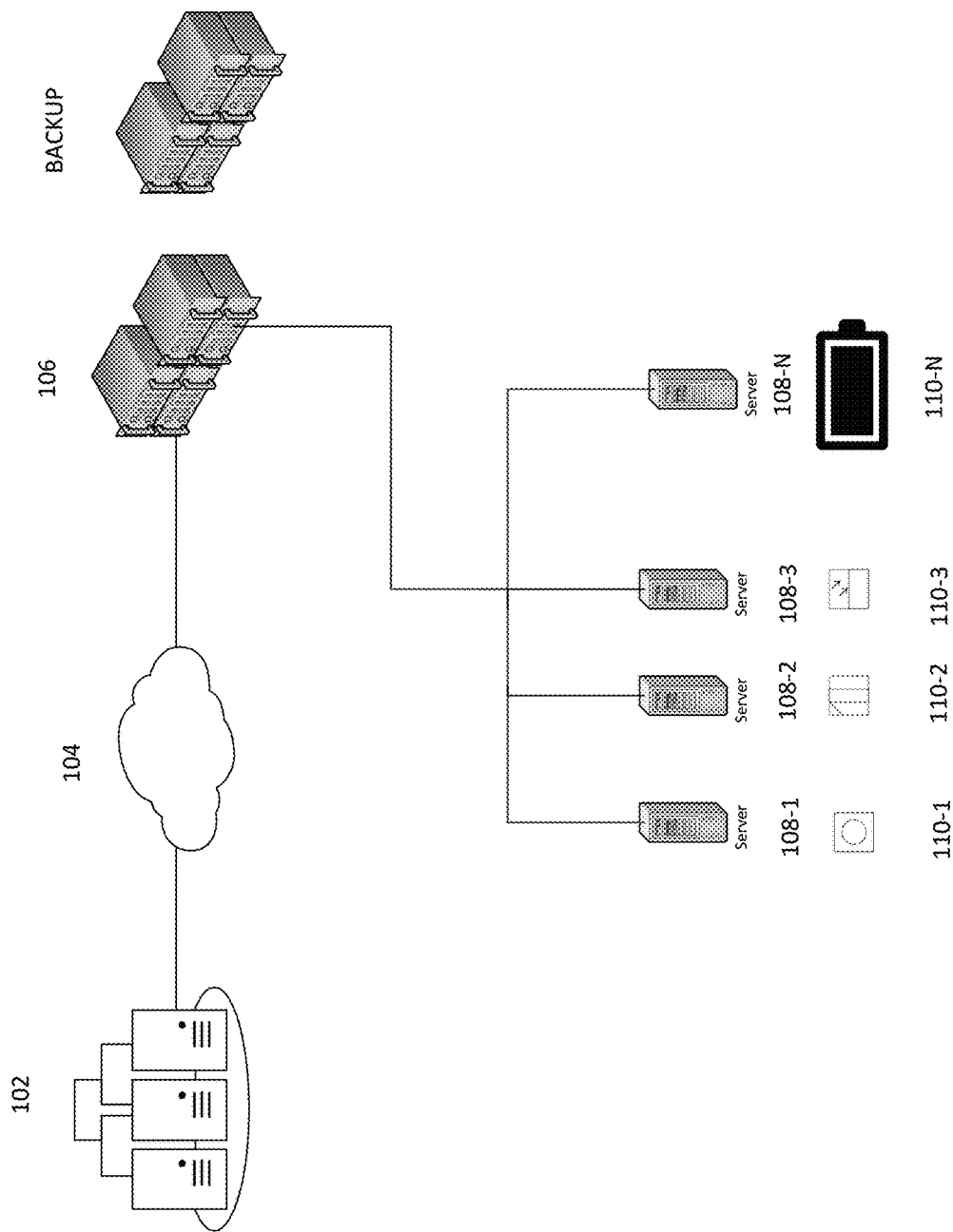
FIG. 1 illustrates an example architecture.

An aspect of the present disclosure relates to systems and methods for energy management.

As similarly discussed elsewhere herein, conventional energy management systems often lack comprehensive monitoring, analysis, and control capabilities, and may be unable to manage heterogeneous power sources at the same plant. Further, many conventional energy management systems lack adequate security, thereby risking the secure and reliable operation of power plants. Additionally, many conventional energy management systems lack adequate failure recovery mechanisms. Yet further, conventional energy management systems generally rely on programmable logic controllers (PLCs) to provide control and automation capabilities for monitoring and managing energy-related processes. The use of PLCs often necessitates that EMS software be adapted to operation with a given PLC model. Yet further, conventionally there are no adequate methods of ensuring a power plant site design will operate as expected when actually implemented. In addition, conventionally, site equipment drivers have to be constantly rewritten in order to accommodate new versions as well as old versions of power plant site equipment, such as programmable logic controllers.

The foregoing deficiencies may result in inefficient energy generation, unreliable operations, and inflexible infrastructure.

The disclosed systems and methods address these technical challenges. For example, disclosed herein is a hardware agnostic EMS which can be configured to manage heterogeneous power sources (e.g., gravity, solar, hydro, hydrogen, wind, gas etc.). In addition, the disclosed systems and methods provide enhanced security via the utilization of encrypted communications with distributed power plant controllers. The disclosed EMS comprises a highly scalable, technology-agnostic intelligent software solutions suite that provides real-time remote monitoring, operational control, and/or artificial intelligence-enabled optimized dispatch across an array of energy storage and generation assets. The disclosed hardware agnostic EMS is configured to coordinate equipment controls such as batteries, inverters, generators, and/or other apparatus to provide a cohesive operational view of a power plant while facilitating continuous data collection and analysis.

Further, the disclosed systems and methods provide enhanced failure recovery mechanisms, further enhancing reliability. For example, optionally the disclosed EMS system may be both locally hosted on a computer system at a power plant (which may be referred to as a site controller) and hosted on an offsite cloud-based system (which may be referred to as an EMS cloud). Optionally, to further enhance reliability, in the event of a system failure of the local computer system hosting the EMS, the operation may failback to the cloud-based EMS system. The power plant controllers may thus be optionally controlled via the local EMS system or the cloud-based EMS system. The disclosed EMS may optionally utilize servers as controllers to be used in place of PLCs, which enables the virtualization of the monitoring and control functions needed to operate power generation infrastructure, thereby further enabling the EMS to be hardware agnostic.

Thus, the disclosed methods and systems overcome many technical challenges in managing energy systems.

Further, an aspect of the present disclosure relates to enabling a user to build a virtual power plant and to test the EMS against the virtual power plant to ensure the EMS software and the power plant design perform as expected or desired.

The sited-based EMS and/or the EMS cloud (which may at times be collectively referred to as the EMS) may communicate with various sensors, meters, and monitoring devices to collect real-time energy consumption, generation, and environmental data. For example, the EMS may optionally communicate with server-based controllers which provide enhanced programmability, standardized hardware platform, and improved flexibility as compared to the conventional use of PLCs (although the EMS may be utilized with PLCs). The server-based controllers and/or PLCs may optionally be collocated (e.g., in very close proximity with the power plant equipment) with the equipment or devices being controlled by the controllers and/or PLCs.

The EMS may include a data analytics module that may be utilized to process and analyze data acquired (e.g., via controllers) via the various sensors, meters, and monitoring devices. As described herein the data analytics module may identify usage and operational patterns and trends, detect anomalies in energy usage, and/or detect component failures enabling the system to generate insights and recommendations for energy optimization and/or enhance the operation of a power facility.

The EMS may include a decision support module and a control module. For example, a decision support module may utilize the analysis to generate instructions and/or recommendations for managing electricity generation, load balancing, the use of backup equipment, and/or peak demand management. A control module may be utilized to implement the instructions and recommendations generated by the decision support module. For example, the control module may interface with energy-generation systems (e.g., gas, solar, wind, hydro, natural gas, coal, and/or other energy-generation systems), energy storage systems (e.g., gravity and kinetic energy-based energy storage systems, batteries, compressed air, and/or other energy storage systems), and/or grid infrastructure to regulate energy flows, switch between energy sources, and dynamically adjust energy generation patterns.

Optionally, the EMS is configured to provide user interfaces, such as graphical user interfaces for display on user terminals, that enable users to monitor energy consumption, monitor operational parameters of energy-related systems discussed herein, and adjust system settings. Optionally, user interfaces may be configured to provide real-time visualizations, reports, and alerts, enabling users to make informed decisions and actively participate in energy management of energy sources.

Certain aspects will now be described with reference to the figures.

Referring to FIG. 1, an example EMS environment is illustrated. A cloud-based EMS computer system 102 is connected to a network 104 (which may be the Internet, or other public or private wide area network and/or local network). The cloud-based EMS computer system 102 may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage). The cloud-based EMS computer system 102 may communicate via the network 104 with one or more site-based EMS systems 106 comprising one or more computer systems hosting EMS software, which may be situated locally at an energy production site.

The site-based EMS system 106 may comprise one or a plurality of servers, that may be run in one or more clusters, where a given server may optionally comprise a microserver to reduce the associated footprint and cost. A server cluster may be utilized that offers improved performance, scalability, availability, and reliability as compared to a conventional server. By distributing the workload across multiple servers, if one server fails, another server within the cluster may assume the workload seamlessly. This redundancy reduces downtime and ensures uninterrupted access to the EMS application.

A server cluster may utilize load balancing techniques to distribute incoming requests or traffic across multiple servers in the cluster. Load balancers within the cluster may intelligently allocate requests to servers based on factors such as server capacity, current load, and/or geographic proximity. This helps distribute the server workload evenly and prevents or reduces the chance that a given server will be overloaded with tasks, improving EMS performance and responsiveness. Further, advantageously, server clusters provide scalability by enabling additional servers to be added to the cluster as demand increases. Such horizontal scaling enables the EMS to handle increasing workloads. As the cluster size grows, the overall processing power and capacity of the EMS increase, ensuring adequate resources to meet growing demands. Yet further, as similarly discussed above, server clusters provide fault tolerance by utilizing redundant components and failover mechanisms. If a server within the cluster experiences a hardware or software failure, the workload may be automatically shifted to other available servers.

The EMS software may comprise small lightweight pieces of code that run on virtualization, each in its own container, thus enabling code to be run on different hardware using containerization and virtual machines. Containerization packages applications and their dependencies into self-contained units called containers. The site-based EMS system 106 may include interface modules (e.g., drivers, proxies, clients, servers, and/or the like) that are used to communicate with various pieces of equipment located at the power plant site. The interface modules may be utilized to ensure that site equipment is operated within limits and provide data to the EMS 106 (and optionally EMS 102). As will be discussed further, different versions of equipment may be associated with different interface module versions. Virtualization may be utilized, wherein in a virtual machine, virtual interface modules are used to emulate hardware devices, such as network and/or device interfaces.

The site-based EMS 106 (and optionally, the EMS cloud 102) may further comprise a supervisor module, that controls the operations of the site. The supervisor module may be hosted on a single server cluster node or the supervisor function can be distributed across multiple cluster server nodes or across a site A given site-based EMS system 106 may be server based, and may comprise one or more backup systems (e.g., one or more backup servers), some or all of which may optionally be incorporated into the same housing or racks as the primary EMS system. The EMS backup systems may be configured to ensure the availability and reliability of significant or critical energy management functions in the event of a primary system failure. The backup EMS systems may utilize redundancy and failover mechanisms to minimize downtime and maintain the continuous operation of energy management processes.

For example, the site-located backup systems may incorporate redundant hardware components such as servers, controllers, and/or network devices. Optionally, the redundant components are configured in parallel to the primary EMS system, continuously mirroring some or all of the data and functionality of the primary EMS system. For example, data (e.g., critical data and/or other data) may be synchronized between the primary and backup systems in real-time or near-real-time to replicate data from the primary system to the backup system. This ensures that the backup system has up-to-date information and can seamlessly take over in case of a primary system failure. Optionally, data may also be synchronized between the site-located EMS 106 (and/or the server-based controllers 108-1, 108-2, 108-3, . . . 108-N discussed herein) and the cloud-based EMS 102.

Thus, advantageously, If the primary site-located EMS 106 fails, the backup system seamlessly takes over, ensuring uninterrupted operation. Optionally, if both the primary and backup EMS systems 106 fail, the cloud-based EMS 102 may seamlessly take over. Optionally, uninterruptible power supplies may be utilized to ensure continuous power availability to the site-located backup systems in the event of short-term power outages or voltage fluctuations.

Failover from the primary system, in the event of a primary system failure, transitions control and operation from the primary system to the backup system. Failover mechanisms may include automatic switches to redirect data traffic, activate backup servers, and/or reconfigure network connections.

Advantageously, optionally, both the site-based EMS system 106 and the cloud-based EMS system 102 may communicate with one or more server-based controllers 108-1, 108-2, 108-3, . . . 108-N (e.g., to provide and/or receive instructions and/or data, such as data described herein). For example, the server-based controllers 108-1, 108-2, 108-3, . . . 108-N may be utilized by the cloud based EMS 102 and/or the site-based EMS 106 to perform data acquisition with respect to the loading, currents, temperature, pressure, battery utilization, and/or other parameters of power-generating equipment. The rate of data acquisition may be programmed, where different types of data may be collected at different rates. For example, power generation system data may be read every 50 ms, while power storage system data may be read every 1 second. By way of further example, the server-based controllers 108-1, 108-2, 108-3, . . . 108-N may use the acquired data to monitor and control energy systems and equipment.

The server-based controllers 108-1, 108-2, 108-3, . . . 108-N may be utilized to perform fault detection and diagnostics: For example, the server-based controllers 108-1, 108-2, 108-3, . . . 108-N may be utilized in identifying faults or abnormalities in energy systems. By way of illustration, server-based controllers 108-1, 108-2, 108-3, . . . 108-N may detect deviations from normal operating conditions, such as sudden energy spikes, equipment failures, or irregularities in power quality. When anomalies are detected, the server-based controllers may be configured to trigger alerts to the EMS, log data for analysis via the EMS, and be utilized to perform automated corrective actions. The server-based controllers 108-1, 108-2, 108-3, . . . 108-N may be utilized to implement energy-saving strategies by adjusting equipment operation and/or optimizing scheduling. Optionally, if a given server-based controller has a failure, some or all of the functionality of the server-based controller may be provided by the EMS system 106, the EMS system 102, or another server-based controller in the fallback configuration.

The site EMS 106 may optionally communicate with the server-based controllers 108-1, 108-2, 108-3 via a conventional Modbus link. Modbus is a serial communication protocol that conventionally does not provide for secure, encrypted communication, risking the operational safety and reliability of the site. Optionally, to enhance communication security, data and/or instructions communicated between the site EMS 106 (or EMS cloud 102) may be encrypted. By way of example, the Apache Kafka protocol may be adapted for use for communication between the site EMS 106 and the controllers. The Apache Kafka protocol may provide security features such as authentication and encryption, and may be configured to use mechanisms such as SSL/TLS for encryption and use authentication protocols such as SASL (Simple Authentication and Security Layer) to secure client-broker communication. Such a communication protocol enables reliable and scalable messaging within a distributed streaming platform. Further, such a communication protocol provides a framework for clients to interact with protocol brokers, enabling efficient data transfer. The protocol may be configured to handle high-throughput real-time data streams and support fault-tolerance and horizontal scalability.

The server-based controllers 108-1, 108-2, 108-3, . . . 108-N may be associated with (and co-located with and/or physically adjacent to) respective different types of power sources, such as energy generation and/or storage systems 110-1, 110-2, 110-3, . . . 110-N, which may be located at different areas//plots of the power generated site. The energy generation and/or storage systems 110-1, 110-2, 110-3, . . . 110-N may comprise photovoltaic cell-based energy sources, gas power generator systems, hydrogen-based power generation systems, thermal power generation systems, coal-based power generation systems, gravity and kinetic energy-based energy storage systems, battery-based energy storage systems, compressed air storage systems, and/or other energy storage systems. Optionally, if a given controller located at one location fails, a controller at another site may take over some or all of the functionality of the failed controller.

The power plant site may be operated in a distributed manner. Advantageously, the EMS cloud 102 and/or site EMS 106 can run different operational programs for different site power sources, enabling different site power sources to produce different amounts of power.

Although the EMS cloud 102 and the site EMS 106 may optionally be capable of performing substantially the same functions (e.g., in the event of a failure of the site EMS 106), in normal operation the EMS cloud 102 and the site EMS 106 may optionally be configured to perform different tasks.

For example, the site EMS 106 may be configured to read and monitor the statuses of field equipment, control and optimize operation of field equipment, store historical data in a local historian database, perform diagnostics and protections for functions such as safety and system availability, provide a browser-accessible graphical user interface (GUI) via which users can view historical and current equipment, view the site EMS 106 statuses and alarms, manage configurations, and send commands to site equipment and devices. Optionally, the site EMS 106 may operate independently of the EMS cloud 102.

By way of further example, the EMS cloud 102 may be configured to securely communicate (e.g., via an encrypted communication channel with secure authentication) with the site EMS 106 over the network 104 for synchronization, retrieve data stored at the power supply site for long-term storage in the cloud, track performance metrics and analytics (e.g., for a specified time period or over the lifetime of the power plant), provide software updates to the site EMS 106, and/or provide a graphical user interface via which users can operate one or more power plant sites that are integrated with the EMS cloud 102.

Optionally, users may be enabled to login to the site EMS 106 while connected directly to the site EMS 106, or remotely through the EMS cloud 102 utilizing a secure portal that supports multi-factor authentication. Optionally, the user interface may communicate with the EMS cloud 102 and/or the site EMS 106 utilizing a secure web service to better ensure that only authorized users can command and control the power plant site.

Optionally, a user interface (displayed on a user terminal) may be hosted by the EMS cloud 102 that may be populated with historical data through a secure connection to the instance running on the cloud. Optionally, the user interface may provide real-time updates from the EMS and render alerts to faults, warnings, and/or changes in status that are relevant to the operation of the power plant site. Optionally, a user interface may be provided via the site EMS 106 or the EMS cloud 102 that enables a user to change the mode of the EMS and place site hardware in-service or out-of-service.

Figure 2:
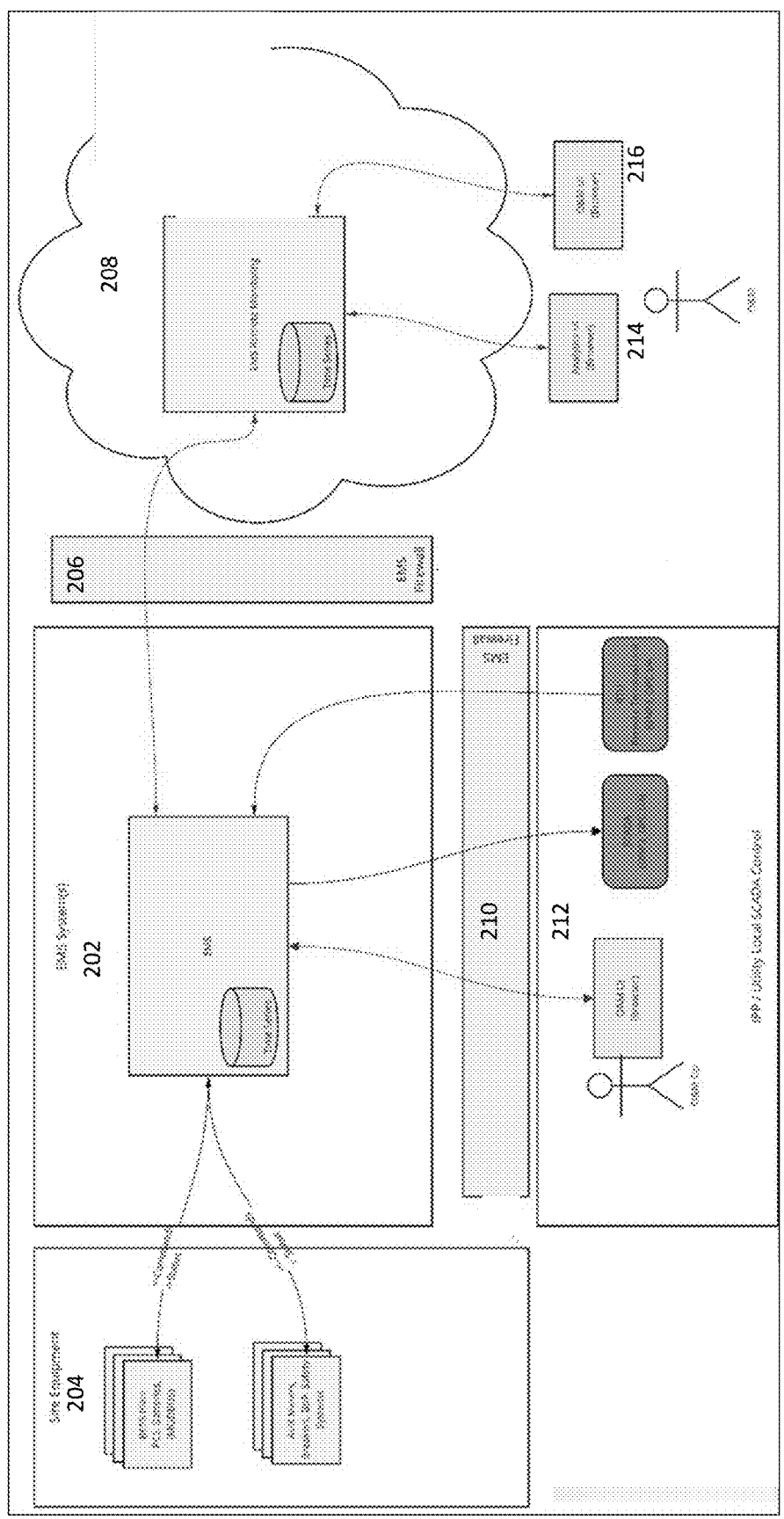
FIG. 2 illustrates an example software architecture.

Referring now to FIG. 2, an example EMS software architecture is illustrated. As similarly discussed elsewhere herein, the EMS software architecture is configured to be highly scalable, available, and adaptable to work with different energy storage systems, including future energy storage systems, and a hybrid combination of different types of energy storage systems.

The site EMS system 202 hosts EMS software which may be executed on redundant hardware enabling the system to operate even in the event of a hardware failure while maintaining the speed needed to support real-time adjustments of power (P) and reactive power (Q) (the power that flows back from a destination toward the grid) to respond to changing grid frequency and voltage. The EMS network is optionally configured to be secure with the utilization of one or more firewalls 206 and 210 (e.g., configured to block malware and application layer attacks and optionally with an integrated intrusion prevention system) and secured network switches (e.g., with unused ports and services disabled/made unavailable, with the switches in a locked area that is inaccessible to unauthorized personnel, where the switches are password protected, and/or the like). By way of illustration, the firewall may protect the system and only allow traffic that is specific to the remote operation of the site through the firewall. The EMS system 202 may comprise control block hardware that may be air-cooled and optionally configured as a standard indoor 19" rack or in an outdoor-rated enclosure.

The EMS system 202 may communicate with an operator control system 212 via the firewall 210 (although optionally, the operator control system 212 may be connected to a network switch directly, avoiding having to have a separate firewall configuration). By way of illustration, customer-specified routes to include communications to the RTU may be configured through the firewall. Optionally, the RTU or customer programmed supervisory control and data acquisition (SCADA) and real time automation controller (RTAC) can be directly connected to the network switch.

For example, the operator control system 212 may comprise a SCADA system including a SCADA Data Gateway (SDG) that provides OPC server capabilities (that converts the hardware communicated data, such as from a PLC, into OPC protocol, to enable other software, such as SCADA, to access the data for the secure and reliable exchange of data in the industrial automation space) to a variety of SCADA protocols such as DNP3, Modbus, IEC 60870, and/or IEC 61850. The operator control system 212 may further comprise a remote terminal unit (RTU) that monitors the field digital and analog parameters and transmits data to the SCADA system (e.g., the SCADA master station). In addition, the EMS software 202 may communicate user interfaces and data and instructions to and/or from a user terminal (e.g., as webpages accessible via a browser hosted on the user terminal). For example, the user interfaces, instructions received from a user via the user interfaces, and/or data populating the user interfaces may include the example user interfaces, user instructions and data described elsewhere herein. The SCADA system and/or user terminal may be associated with and accessible by a power utility operator and/or an independent power producer to monitor site operation and to provide instructions to the EMS.

The system can be set to follow RTU commands or manual commands from the user. While the system is charging and discharging, it may balance the SOC (state of charge) continuously across some or all battery banks. The system can also take battery banks out of operation or place battery banks into operation.

In addition, the EMS system 202 may communicate with power plant site equipment 204, where the EMS system 202 may transmit commands to the site equipment 204 and may receive status and/or other data from the site equipment 204. For example, the site equipment 204 may include battery energy storage systems (BESSs) which may be used to compensate for power intermittency (e.g., as a result of equipment failure, or other unavailability of power, such as during the night for solar power), power conditioning systems (PCSs), auxiliary meters, power breakers, Balance of Plant (BoP) power plant components, safety systems, and/or the like. By way of example, optionally the EMS system 202 may communicate with power plant site equipment 204 via communication protocols discussed herein (e.g., Apache Kafka, MODBUS, etc.). Optionally, battery blocks are connected to a network switch through a connected ring network. Optionally, groups of battery blocks may be connected through a single fiber loop.

The site EMS 202 may communicate with the EMS cloud 208 remote monitoring services via the firewall 206. Optionally, to enhance security, only routes that have been explicitly opened are available for communication with the EMS cloud remote monitoring services 208. The EMS cloud remote monitoring services 208 software may provide functionality such as described elsewhere herein. For example, the EMS 202 may pass data to the cloud-based EMS remote monitoring services 208, and the remote monitoring services 208 may provide insights into the data remotely (e.g., to the power plant operator/owner). The collected data may be utilized in protecting the power plant site equipment and in ensuring the power plant equipment operates within specified parameters while enhancing the efficiency and safety of the systems overall. Advantageously, the EMS remote monitoring services 208 is configured to increase safety of site personnel as well as to optimize site performance.

The EMS cloud 208 may generate and provide user interfaces 214, 216, via a user terminal. The user interfaces 214, 216 may be populated with analytics data and enable operation and maintenance (O&M) respectively.

For example, a user interface may graphically depict, via a single line drawing (SLD), a symbolic representation of an architecture of a power plant being managed via the EMS, and which may depict the paths for power flow (including real power in megawatts (MW) and reactive power in megavolt amps (MVR)) between entities of the system. By way of illustration, if a direct current system is being represented, the line may include the supply and return paths, while in a three-phase system, the line may represent all three phases. The SLD may include symbolic representations of electrical elements such as circuit breakers, switchgear, transformers, surge arresters, capacitors, electrical bus bars, conductors, and the like.

For the AC power, the user interface may also depict in real time, the megawatts, the megavolt amps the megavolt amperes (MVA), and the power factor (PF) (the ratio of working power to apparent power). In addition, the user interface may report the current AC setpoints (target or desired operational parameters) and the most recent setpoint commands (e.g., the last setpoint command, the last 5 setpoint commands, or other specified number of previous setpoint commands). New setpoints may be entered prompting the EMS (e.g., the site EMS) to interact with devices and equipment (e.g., batteries, inverters, generators, and/or other apparatus) to modify operation (e.g., voltage, frequency, reactive power, power factor, ramp control, etc.) to achieve the new point. The user interface may report site meter data, such as real power, reactive power, apparent power, power factor, grid frequency, three phase AC sinusoidal voltages (e.g., line-line voltages AB, BC, and CA). The AC status may be reported via the user interface, such as the AB, BC, and CA line-line voltages and the currents for the respective three phases. For DC power, the line-to neutral (L-N) voltages and current may be reported.

The user interface may also graphically and textually depict the nominal power plant energy capacity (e.g., a designed and installed capacity, and maximum producing capacity under specified conditions that is the full-load sustained output), in megawatt-hours (MWh) and/or kiloampere hours (kAh) and the real time percentage utilization thereof. Optionally, the current available energy capacity may be reported in real time. Optionally, the user interface may render graphs that depict, over a specified period of time (e.g., the last hour, the last 3 hours, the last 24 hours, etc.), the power plant real power and reactive power setpoint. Optionally, controls may be provided via which a user can add additional data points.

Optionally, the site-based EMS 106 may be configured with dynamically deployed, run-anywhere microservices, where microservices may be deployed and managed in a flexible and scalable manner, enabling the microservices to run on various platforms and environments. Such an approach provides scalability and portability in a distributed system architecture. For example, containerization may be used to enable run-anywhere microservices, where containers provide a lightweight and isolated runtime environment for the microservices, making them portable across different operating systems and cloud platforms.

An orchestration platform may be utilized to define the desired state of the microservices, handle automatic scaling, and distribute the workload across multiple containers or server nodes. A service discovery mechanism may be utilized to enable microservices to locate and connect to each other dynamically. A configuration management module may be utilized to configure certain microservice parameters, such as database credentials, API keys, and/or external service endpoints.

Optionally, a given site may be defined in software by a single configuration of site equipment and devices that specifies how they are electrically connected. Such specified configuration enables large scale deployment of digital twins (a digital representation of some or all of the site, and equipment and device therein). The digital twin may act like the power plant equipment from a software interface standpoint and where the digital twin may be indistinguishable to the EMS from the physical equipment with respect to the respective software interfaces (which may be identical). The digital twin enables a high fidelity model of the site to be deployed for simulation, integration, testing, monitoring, and/or maintenance. The site may be automatically deployed to a test framework enabling the site software to be tested in its final configuration before being deployed to the physical site. For example, based on the results of the automatic testing (e.g., the successful result) the configuration can be automatically deployed to a physical site immediately or in response to detecting a maintenance timeframe. Optionally, the configuration may be deployed manually.

Figure 5:
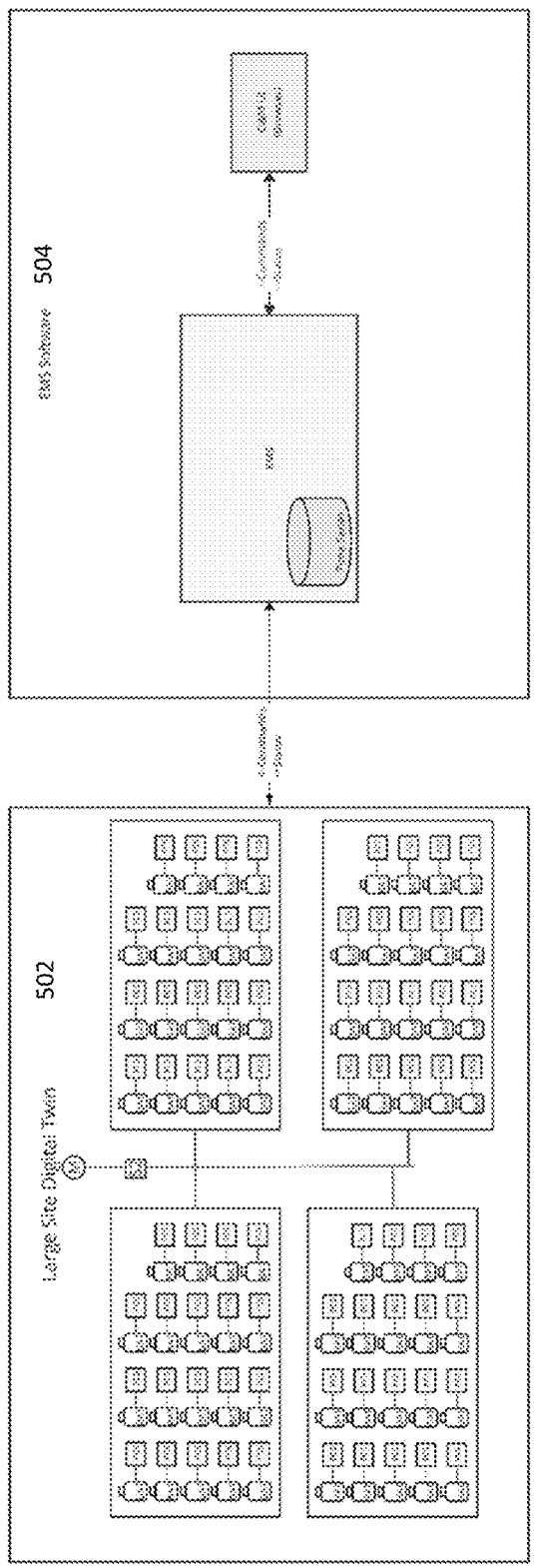
FIG. 5 illustrates an example use of a power plant site digital twin.

For example, referring to FIG. 5, a digital twin 502 of a large battery storage site is illustrated. The digital twin 502 illustrates the connection between PLCs and batteries, between the battery banks and a circuit breaker, and between the circuit breaker and a load. The EMS software 504 communicates commands to the digital twin 502 and receives data, such as status data, from the digital twin 502 as if it were a physical, large battery storage site. The EMS software 504 may receive commands from a user via an operation and maintenance (O&M) user interface presented on a user terminal, which it may in turn relay the commands to the digital twin 502. Similarly, the EMS 504 may populate the user interface with data (e.g., status data) received from the digital twin 502. By way of further example, the EMS 504 may populate the user interface with time series data based on an analysis by the EMS software 504 of data received from the digital twin 502.

Time series data analysis in energy management systems may provide a comprehensive understanding of energy consumption, load patterns, renewable energy integration, anomaly detection, and performance optimization. For example, time series data may be used to track and monitor energy consumption patterns over time. By collecting and analyzing energy consumption data at regular intervals, the EMS may identify consumption trends, peak demand periods, and energy usage patterns. This information may aid in optimizing energy usage and identifying opportunities for energy efficiency improvements. Time series data may be used to identify anomalies or abnormal patterns in energy consumption or system behavior. By comparing real-time data with historical data, the energy management system can detect deviations, spikes, or unusual trends that may indicate equipment malfunctions, energy wastage, or other operational issues. Time series data may also be used to evaluate and monitor the performance of energy assets, such as generators or transformers, over time. By analyzing trends and deviations in performance metrics, the EMS may identify inefficiencies, assess equipment health, and optimize energy asset utilization.

As similarly discussed elsewhere herein, dynamically deployed device interface modules may be utilized to enhance fault tolerance and flexible deployments. Optionally, dynamically deployed controllers are utilized to provide fault tolerance and functional improvements through their ability to balance workload, detect failures, recover from faults, provide service discovery and routing, support auto-scaling, and facilitate dynamic reconfiguration. Such features enhance the system's resilience, scalability, availability, and performance.

The dynamic deployment of device interface modules in an EMS overcomes technical challenges not conventionally addressed. In the industrial control world, and in particular power plants, conventionally many device interface modules and control devices are controlled by software that runs on dedicated equipment or simple programmable logic controllers. Disadvantageously, conventionally interface modules are thus tied to specific hardware in control systems. To the extent that failover capabilities are provided in such conventional approaches, typically those failovers are onto a specific backup device that runs on standby. This rigid approach may complicate deployment of the software and necessitate redundant equipment.

By contrast to conventional approaches, dynamically deployed EMS hardware control device interface modules may be used to control hardware devices that can be run in multiple systems. For example, dynamically deployed device interface modules may be co-located with the equipment they are to communicate with, be executed by an on-site computer system co-located with equipment, or be executed to run remotely in the cloud (e.g., the EMS cloud 102). The ability to deploy EMS hardware control interface modules that can run on different systems and are not restricted to specific hardware provide several technical improvements over conventional approaches. For example, the need for redundant equipment (e.g., computers that communicate with power plant equipment such as inverters and battery storage systems) may be greatly reduced (although such redundant equipment may be used). By way of illustration, using the described technology, when a computer co-located with power plant equipment fails, the EMS may dynamically execute (on the EMS computer system) a virtual interface module that controls the power plant equipment. Further, the virtual interface modules may be executed on multiple on-site computers and thus a cluster of computers may provide many combinations of redundancy to control individual items of site equipment and devices. Optionally, the computer selected to execute an interface module may be selected so as to reduce or minimize latencies between the computer and the equipment or device for which the interface module will be used.

Figure 3:
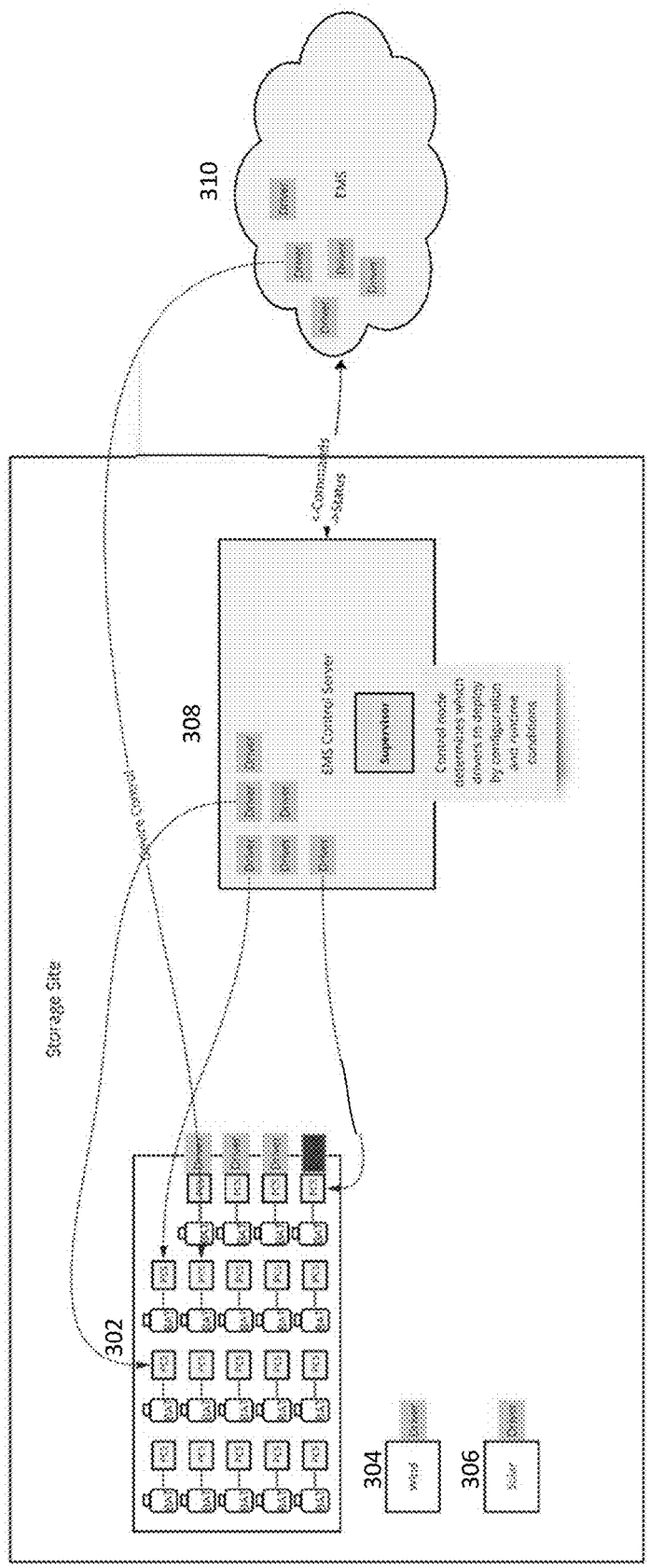
FIG. 3 illustrates an example power plant and EMS configuration.

Referring now to FIG. 3, an example storage site architecture comprising a system of batteries 302, wind turbines 304 (having an associated interface module), and solar power generator 306 (having an associated interface module), is illustrated. In this example, battery banks are associated with respective PLCs (although some or all of the PLCs may be replaced or augmented with a server or other computer system performing PLC functions). As will be described, there may be multiple instantiations of a given device interface module (e.g., in the memory of one or more controller devices, in a site-based EMS, in an EMS cloud, and/or the like).

For example, a given PLC (or a server performing PLC functions) is associated with a respective interface module. The interface module may be selected by a control node of the site-based EMS system 308, which may store different interface modules for different devices and equipment. For example, a site-based EMS system 308 supervisor module may determine which interface module to deploy based on the configuration (e.g., the version and/or manufacturer of the PLC) and runtime conditions. As similarly discussed elsewhere herein, if a interface module associated with a PLC fails (e.g. as a result of a bug or programming error, as a result of a software update which is incompatible with the PLC, as a result of a lack of system resources or PLC hardware failure, etc.), the site-based EMS system 308 may select and execute the interface module using EMS system 308 resources (e.g., processing bandwidth and memory). Optionally, for test purposes or in the event the site-based EMS system 308 has failed, and a failover to the EMS cloud 310 has taken place, the EMS cloud 310 may select and execute a PLC interface module (e.g., in the event of a failed PLC interface module).

Optionally, the EMS system 308 may be set by a user via a user interface to follow RTU commands or to carry out manual commands from the user. Optionally, while the battery system 302 is charging and discharging, the state of charge (SOC) may be balanced continuously across the various battery banks, where the SOC is the level of charge of an electric battery relative to its capacity. Optionally, the EMS system 308 can, automatically or under manual control, place battery banks in operation or take battery banks out of operation.

The disclosed software may be reusable, flexible software composed in one or more transportable languages (e.g., JAVA, PYTHON, etc.) that can run on small, embedded computers, enterprise servers, and/or cloud-based computer deployments.

In the event an item of software (e.g., an interface module) is needed, the EMS may detect the availability of the software and then launch backup instances either in hot standby or on-demand. For example, hot standby software may be used to ensure high availability and fault tolerance by maintaining a redundant backup that can seamlessly take over operations in case a primary system fails. The hot standby software may monitor the health and availability of the primary system (e.g., checking system metrics, network connectivity, application responsiveness, and/or other relevant indicators). If the primary system is detected as unavailable or experiencing issues, the hot standby software may trigger the failover process. During failover, the backup software may take over the workload and operations seamlessly, assuming the role of the primary system. This failover transition may optionally include redirecting network traffic, activating services, and.ir ensuring data consistency.

Optionally, the EMS determines the best virtual interface module to deploy depending on the current conditions and use cases. For example, if a computer co-located with a power plant equipment or device asset is available to execute the virtual interface module, the drive may be executed on such computer. If the computer is determined to be unavailable, the interface module may be executed on the site EMS or by the EMS cloud. Thus, advantageously, dedicated or specific backup computers are not required to ensure continuity of operations on the site. In addition, costs, energy consumption, and the hardware footprint of the site may be reduced.

Optionally, multiple computers may be distributed across the site. Thus, if there is a physical failure of a sector of the site (e.g. a failure of a given computer that controls site equipment or a disruption in auxiliary power), the control of the affected site equipment or devices may fail-over to another computer that may execute the appropriate interface module.

Thus, the disclosed architecture may increase the availability of the power plant site (e.g., approaching 100% availability) and provides enhanced fault tolerance as compared to an architecture that relies on dedicated standby PLCs or servers. Further, the disclosed architecture may provide enhanced flexibility with respect to the hardware deployed to the site. Still further, the disclosed techniques facilitate collocating interface modules with the hardware in cases where the hardware interfaces may be insecure, enabling the interface module to provide a secure interface into the equipment or device.

Further, the dynamic deployment controllers may be utilized to provide fault tolerance and functionality improvements. By way of example, a conventional power generator plant is run as a single operation. Conventionally, supervisory controllers run on a single server, sometimes with provisions for a hot backup. More recently, the concept of virtual power plants has been developed. A virtual power plant may couple multiple power plant assets as a single resource. The disclosed hardware and software architecture, and techniques may improve the operation of a virtual power plant by better facilitating the dynamic distribution of energy from multiple power generators in real time, such as behind the meter assets (e.g., distributed energy resources, such as solar panels and energy storage system, such as batteries).

Further, software controllers may be dynamically deployed in different environments. Using the disclosed hardware and software architecture, and techniques, a power generator may be dynamically coupled to other assets, such as behind the meter resources as part of a virtual power plant. Thus, rather than be limited to transmitting commands to nodes in the virtual power plant, the control software itself can also be distributed between power generator assets and may provide control of multiple assets in the network.

As discussed elsewhere herein, a server cluster may be utilized that offers improved performance, scalability, availability, and reliability as compared to a conventional server. The nodes may be deployed across a cluster and that can be further extended into cascading commands to individually deployed assets. For example, cascading commands may be utilized to propagate commands or actions from one node or server in the cluster to other nodes in a sequential or cascading manner. Cascading commands may be utilized to manage and coordinate the behavior of the cluster as a whole.

For example, a lead node may be configured to take over a given use case and delegate to follower nodes across multiple sites as needed. Such delegation enables the distribution of workload, improves fault tolerance, and enhances overall cluster performance. The lead node may determine the tasks that need to be performed within the cluster. Examples of tasks include processing incoming requests, executing computations, managing resources, taking equipment off line or placing equipment on line, or coordinating cluster operations. The use of a server cluster and cascading commands may be used in conjunction with the interface module framework described herein to enable the site to be dynamically controlled across different compute assets, including assets that may come online or go offline over time. A remote node may serve as a gateway for remote control ensuring authorized tasking is passed to the site lead node. The remote node may optionally also serve as a backup to the lead node and may also perform as a follower node. The use of a server cluster and lead and follower nodes may be scaled to massive virtual power plants with multiple layers of leads and followers.

A given cluster node may be located at the power plant it is being used to control aspects of, may be located at another power plant and used to control aspects of two or more power plants, or may be cloud-based and used to control equipment at one or more power plants.

Figure 4:
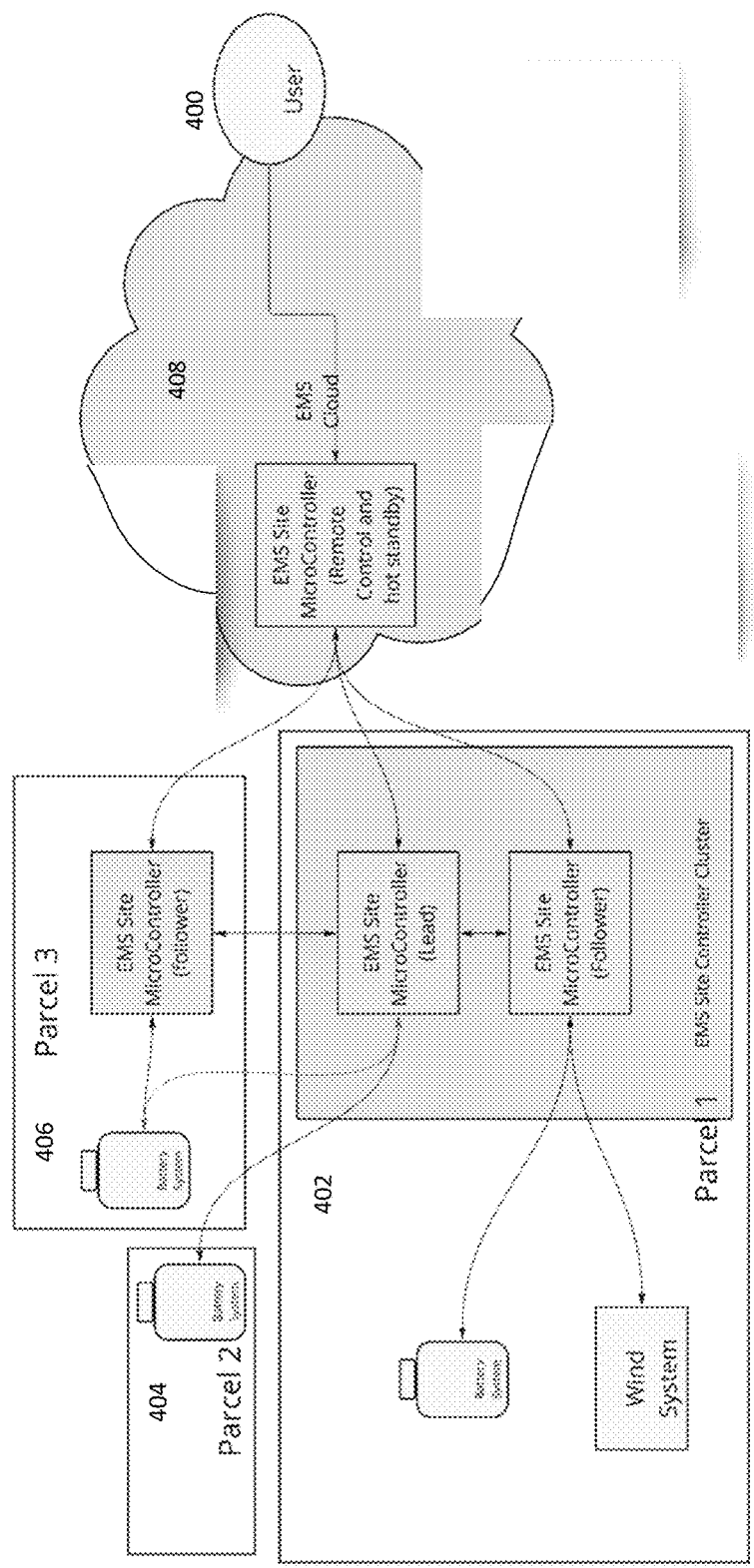
FIG. 4 illustrates an example process and architecture.

Referring to FIG. 4, an example process and architecture are illustrated. Although microcontrollers may be referred to in this example, other types of appropriately configured computing devices may be utilized. The microcontrollers may be configured for use in power generation facilities (e.g., specialized microcontrollers designed for use in power generation facilities). A given microcontroller may comprise an embedded system that incorporates a microprocessor (e.g., configured to handle complex calculations and control algorithms needed for monitoring and controlling power plant processes), memory, input/output interfaces, and other components (optionally on a single chip). The input/output interfaces may be configured to connect with sensors, actuators, and other power plant equipment. The input/output interfaces may include analog-to-digital converters (ADCs), digital-to-analog converters (DACs), serial communication ports, pulse-width modulation (PWM) outputs, and/or the like. A given microcontroller may support one or more communication protocols (e.g., Modbus, Profibus, Ethernet, and/or the like) to enable data exchange with other power plant systems (e.g., the EMS) and devices. A given microcontroller may be equipped with a real-time operating system (RTOS) or a real-time kernel to handle time-critical power plant tasks.

A given microcontroller may be used to monitor and control various processes, such as fuel supply, combustion control, turbine speed, and/or generator voltage regulation. Using the input signals from sensors, the microcontroller may ensure that the power plant operates within safe and efficient limits. The sensor data may include information related to temperature, pressure, flow rates, voltage, current, and other relevant parameters. Such data may be utilized to monitor the plant's performance, to detect abnormalities, and perform operation optimization to enhance plant efficiency.

A user 400 may task the system to perform operations via the EMS cloud 408 via commands submitted via a user interface or file. An EMS cloud 408 remote control node, configured to perform remote control and hot standby functions, may pass the tasks to an EMS site microcontroller lead. The EMS site microcontroller lead may then perform real time distribution of tasks to EMS microcontroller followers. Site microcontroller nodes (which may be part of site-located EMS server cluster), comprising the EMS site microcontroller lead and EMS site microcontroller followers, may be distributed across geographic regions (e.g., parcel 1 402, parcel 3 406) or be collocated. For example, the battery system of parcel 2 404 may be controlled directly by the EMS site microcontroller lead located at parcel 1 402. The collection of controllers may run in a cluster and may support failover and may be used to distribute the processing load amongst the controllers. The lead node receives tasks for the site and appropriately delegates tasks to the appropriate follower nodes to ensure the corresponding operations are performed. Certain nodes may be in hot standby (such as the EMS hot standby node), ready to seamlessly assume the tasks of another node in the event of a node outage.

Optionally, the lead node, tasked with coordinating the action of other nodes in a cluster may be determined based at least in part on node votes using a voting process (e.g., which may occur in the event of a failure of a current lead node such that it can no longer perform leader functionality). The voting process may ensure consensus despite node failures or network issues. Optionally, the initial cluster of nodes may contain an odd number of nodes (e.g., 3 nodes, 5 nodes, 7 nodes, 9 nodes, or the like). Optionally, a cluster may comprise at least 3 nodes. Optionally, where the initial cluster of nodes includes an odd number of nodes, when a node fails one of the remaining nodes may be excluded from the voting process to ensure that there is an odd number of nodes remaining (which ensures that a remaining node can receive a majority of votes and ensures that there is no hung vote, where two or more nodes receive the same number of votes). Optionally, if there is an evenly split vote, and no candidate wins the majority, the election may be designated a failure, and a new election may automatically be triggered (e.g., after a random timeout period). Such randomization may help avoid repeated split votes by staggering the new election timing, giving one candidate a better chance of gaining a majority. Optionally, the election process repeats until one candidate successfully receives a majority of votes and becomes the leader. Other techniques may be utilized to handle an evenly split vote (which may depend on the voting process used).

Certain example voting processes will now be described.

A Raft consensus voting process may be utilized. In Raft, when a node becomes a candidate (e.g., when a current leader has a failure and is no longer capable of acting as a leader), the node transmits requests for votes to other nodes. A given node may cast its vote for one candidate in an election term. A node becomes the leader node if it receives votes from a majority of the nodes in the cluster, and the other nodes will be follower nodes. If no candidate wins the majority, a new election may be initiated.

By way of further example, a Paxos consensus voting process may be used. Paxos uses a series of rounds in which proposers propose values (including leadership). Acceptors (nodes) vote to accept or reject these proposals. The leader may be the node whose proposal is accepted by a majority of acceptors. Advantageously, this process is highly fault-tolerant and ensures consistency although it may take longer to execute the Paxos consensus voting process then certain other voting processes described herein.

Optionally, a Multi-Paxos consensus voting process may be used. Multi-Paxos is an extension of Paxos where, after an initial leader is elected, the leader remains for multiple rounds, reducing the need for frequent voting. The Multi-Paxos consensus voting process is similar to the Paxos consensus voting process, except once a leader is chosen, it handles decisions until it fails or resigns. Advantageously, Multi-Paxos reduces the number of elections needed, improving efficiency and leadership stability.

By way of still further example, a Bully voting process may be utilized, wherein a follower node (the "bully") can initiate an election if it notices or determines that the current leader has failed (e.g., the current leader has failed to communicate with the follower node for a threshold period of time). The node with the highest ID among those participating in the election is selected as the new leader. Thus, if no higher ID node responds, the "bully" wins and becomes the new leader. Optionally, nodes with lower IDs can challenge the leader if they believe they should be the leader.

Optionally, a ZooKeeper Atomic Broadcast (ZAB) voting process may be utilized to achieve consensus. In the leader election phase, nodes propose themselves as leaders and send votes. The node with the most votes or the highest priority (such as an epoch number) becomes the leader. Advantageously, ZAB enables leader failover with minimal delay.

Optionally, a quorum-based voting process may be utilized. Nodes in a cluster form quorums (a majority of nodes). The quorum that can agree on a leader elects one, where the leader is selected based on the votes from a majority of the quorum members. This method ensures strong consistency as decisions are made only when a majority agrees.

In a node cluster vote, the geographic location of a given node may be taken into account. For example, where the cluster is spread out over multiple power plant installations or over a large power plant installation, it may be helpful to reduce latencies with respect to a leader communicating and issuing commands to follower nodes. Thus, in a distributed power plant control system spread across a large area or multiple geographic regions, factoring in node location may better ensure that leader selection optimizes performance and reliability. Some or all of the nodes in a given cluster may be informed by the EMS, via a message, of their geographic location (e.g., by latitude, longitude, elevation), and/or those of some or all of the other nodes in the cluster. Following are examples on how geographic location may influence node voting and leader selection:

As discussed above, optionally communication latency considerations may influence the votes for leader. Nodes closer to the leader or the majority of the nodes can reduce latency and improve performance, which is especially important for EMSs, wherein the nodes are engaged in frequent communication with the leader. Voting nodes can prioritize candidates that are geographically closer or located in the same region to minimize latency.

For example, using the voting processes discussed above, if a cluster is deployed across installations, nodes may vote for a leader from their region to reduce cross-region communication time.

Fault tolerance may also be enhanced by taking geographical location into consideration in the voting process. Geographic diversity helps improve fault tolerance by preventing a single geographic failure (such as might occur from a fire, hurricane, or earthquake) from taking down the entire cluster. Voting nodes may avoid electing a leader from a region that is more prone to outages or less reliable due to environmental factors, network stability, or availability zone performance.

The node locations can be used to ensure that a leader is selected from a region with a majority of nodes or where replication is more efficient. Thus, nodes may vote for a leader located in a region where the majority of other nodes reside, reducing the cost of replication and ensuring a majority quorum can be easily maintained.

Nodes may be configured to prefer leaders that are geographically close to the primary data source or data access points (e.g., sensors, end points, or the like) to enhance data read/write speeds.

The voting processes described herein may be used to enhance load balancing across regions (e.g., in the case of a virtual power plant comprising multiple different power plant sites). For example, the distributed systems described herein may be configured to balance load across multiple regions to avoid overloading the systems and devices at a given geographic area. Thus, by way of illustration, voting nodes can elect a leader from a less-loaded region, distributing the workload more evenly across geographic zones.

Thus, geographic location is optionally a factor that can be considered in node cluster voting to optimize for latency, fault tolerance, availability, and/or load balancing and regulatory compliance.

Figure 9:
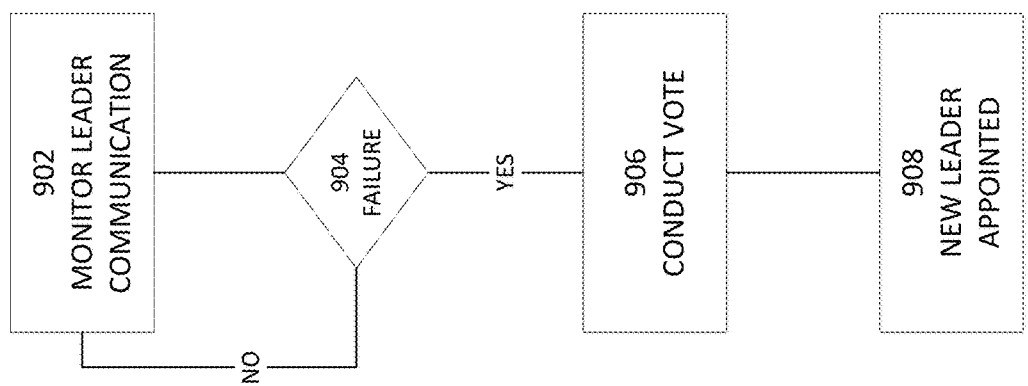
FIG. 9 illustrates an example cluster voting process.

FIG. 9 illustrates an example cluster voting process. At block 902, communications of a leader node (e.g., a periodic heartbeat communication indicating that the leader node is operational), is monitored. For example, one or more of the follower nodes may monitor such leader node communications.

At block 904, a determination is made that the leader node has failed as is no longer operating properly. For example, a follower node may determine that the heartbeat communication has not been received within a threshold period of time.

At block 906, a vote for a new leader node may be taken by the cluster nodes currently designated as follower nodes. The vote may be taken using an example voting process described herein. At block 908, based at least in part on the vote result, one of the nodes that had previously been a follower node is elected and assumes leader node duties and functions.

Optionally, multiple user signals may pass tasking to the EMS. For example, user signals may define multiple ways for power to be commanded, serving multiple customers. A given system or parcel may be metered and the metering from the different systems or parcels may be combined to form virtual meters to ensure power is being distributed as needed.

A technical problem introduced by using offsite software instances, such as interface modules, to control site assets (e.g., equipment and devices) in the event of an on-site failure, is that latencies may be introduced in communicating comments to power plant assets and in receiving data from assets. Optionally, the assets may be controlled at a slightly slower rate to accommodate such latencies, however, taking such assets offline may be avoided even when site computers (e.g., hosting the site-based EMS) fail and are not operational.

Certain concepts, similar to those discussed elsewhere herein with respect to the automatic deployment of software assets may be applied to a test and deployment infrastructure.

A power plant site may be defined by configuration. The configuration may be applied to determine how the site is deployed as well as the creation of a test framework. Conventionally, energy storage and industrial control systems are large and so tend to be difficult to test. In addition, with respect to testing battery storage systems, batteries are difficult to store prior to deployment, and experience degradation during test. Further, appropriate test equipment is expensive and may even be unavailable due to limited supply and heavy market demands.

In order to address the lack of equipment to test prior to deployment, a robust test framework is needed. Such a test framework will now be described. An emulation framework is provided that emulates some or all of the equipment onsite at the power plant. The test framework enables the modeling of equipment and devices that are electrically connected and the modeling of when a given device is operating. In addition, the behavior of the sensing aspects of the site, including meters, may be modeled. For example, the sensing of power/reactive power, current, voltage, temperature may be modeled.

Further, deployment challenges presented by the use of various types of equipment from various equipment vendors may be addressed via a vendor interface module library. For example, multiple versions of the interface module library may be developed with a software emulator. Thus, rather than attempting to have a single interface module work with older and newer versions of a PLC, each version of the PLC may have its own interface module. Thus, an older version of the PLC may be utilized with an older version of the interface module compatible with the older version of the PLC, and a newer version of the PLC may be utilized with a newer version of the interface module compatible with the newer version of the PLC. This approach may enhance reliability, while reducing the need to constantly modify interface module code.

A site configuration registry may be generated and stored in memory that defines some or all of the following:
- hardware on the site
- the electrical connection between site equipment and assets
- the applicable use cases of the software
- limits for the equipment and site operations
- what interface module version to deploy A site configurator software program may access the site registry from memory and deploy the site configurator to both test and operational sites. A DevOps pipeline may be defined that enables the site configuration to be automatically used to test a virtual site and then automatically deploy to the site remotely. A DevOps pipeline, also known as a CI/CD pipeline (Continuous Integration/Continuous Deployment pipeline), may comprise a set of automated processes and tools that facilitate the development, testing, and deployment of software applications.

Thus, because a site may optionally be defined in single configuration file, the software may be deployed to site equipment or test computers (in the cloud or onsite) and the software may be run against either real physical site equipment, emulated equipment, or a mix of real physical site equipment and emulated equipment (where physical equipment that is not yet onsite or that is otherwise unavailable for testing may be emulated). Advantageously, optionally, the real equipment and emulated equipment may be indistinguishable to the EMS software, enabling the emulated equipment to be exercised as if it's actual operation.

The emulation framework enables the scaling of very large physical sites in scalable cloud servers, enabling multi-GWh sites to be simulated in virtual operations prior to deployment to the site. This enables the site capabilities to be demonstrated to end users (e.g., power plant site operators) well in advance of physical deployment, as well as providing the opportunity to resolve software issues and deficits prior to deployment. Further, and particularly with respect to large power plant sites, emulation of the site modeled with respective equipment and devices electrically connected and deployed to the cloud, enables a higher fidelity virtual digital twin deployment which better provides a fuller demonstration of capabilities of the EMS without needing any of the physical site equipment and devices.

Additional orchestration (e.g., managing and coordinating the deployment and execution of tests in a test environment) enables the efficient and automated management of various testing components, such as test cases, test data, test environments, and test execution and the deployment of the software in a test configuration. The test configuration can be tested with test commands and use cases passed to the EMS via the public endpoints and/or via the emulation framework. Based on the test results (e.g., the success or failure of the automated tests, which may be determined by a comparison of expected or desired power plant site behavior with the simulated power plant site behavior), a decision may be made as to whether the software is ready to be deployed to the hardware at site.

By way of illustration, if aspects (e.g., operating parameter values) of the simulated behavior differ by more than corresponding threshold amounts from expected behavior (e.g., expected operating parameter values), a failure indication may be generated, and the software may not be deployed. If, instead, if aspects of the simulated behavior do not differ by more than corresponding threshold amounts from expected behavior, a pass indication may be generated, and the software may be deployed. Such aspects may relate to the temperature of various power plant apparatus, the state of charge of a battery energy system, real power, reactive power, apparent power, power factor, three phase AC sinusoidal voltages, and/or other aspects, such as those disclosed herein.

For example, if the software successfully passes the automated testing, the software can then be deployed to the hardware at the power plant site (e.g., automatically, using scripted deployment, or manually). As similarly discussed elsewhere herein, the software may be substantially immediately deployed to the site upon passing testing, or the software may be downloaded to memory of the site-located computer hosting the EMS, and may be installed and deployed at the next available scheduled maintenance time frame or other specified time.

Figure 6:
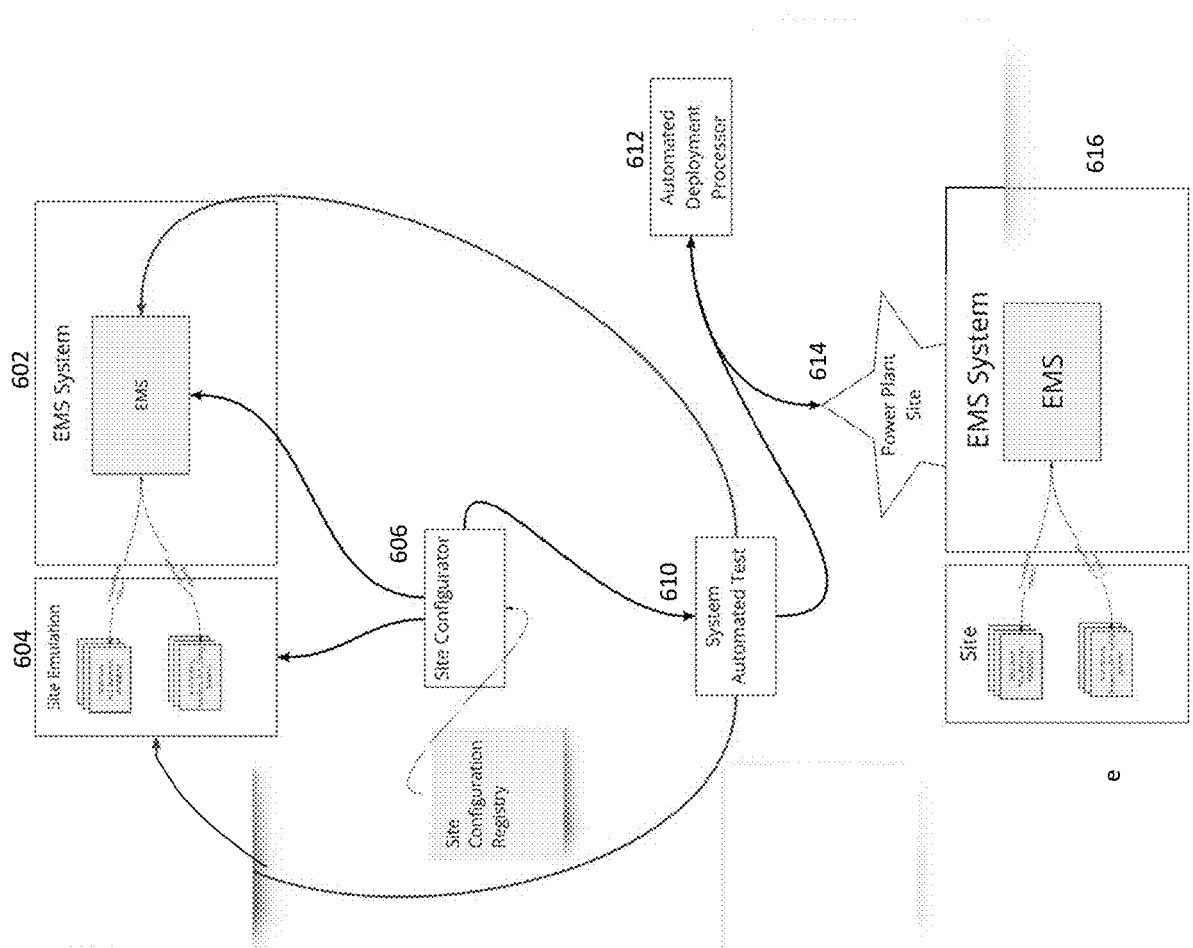
FIG. 6 illustrates an example emulation-based test process and software deployment.

Referring now to FIG. 6, a site configurator 606 accesses a site configuration registry (e.g., that defines hardware on the site, the electrical connections between site equipment and assets, the applicable use cases, limits for the equipment and site operations, what interface module version to deploy, and/or the like) and creates emulators 604 for the corresponding hardware on the EMS cloud 602, where the EMS cloud 602 can interact with the emulation of the power plant site hardware. The site hardware (which may include software) that may be emulated may include battery energy storage systems (BESSs), power conditioning systems (PCSs), auxiliary meters, power breakers, Balance of Plant (BoP) power plant components, safety systems, communication buses and protocols (e.g., Apache Kafka, MODBUS, etc.), and/or the like. The emulation enables large-scale testing of the site defined by the site configuration registry (which may correspond to both the emulated equipment and the actual, physical equipment).

A system automated test module 606 may inject user cases (e.g., loads, etc.) into EMS endpoints, the emulated equipment may respond to the use cases, and the automated test module 610 may monitor the emulated equipment to determine whether they are operating as expected or desired. Example endpoints may include data acquisition endpoints responsible for collecting data from various sources within the energy system, control system interfaces endpoints that enable the EMS 602 to interact with control devices or equipment, energy storage endpoints that enable monitoring and control of energy storage systems (e.g., charging, discharging, state-of-charge information, etc.), renewable energy interface endpoints, demand response endpoints that enable the interaction between the EMS 602 and external entities such as utility companies or demand response aggregators (e.g., where the endpoints receive signals or requests for load reduction or load shifting during peak demand periods to enable the EMS 602 to curtail loads, adjust energy consumption, or participate in demand response programs), communication gateway endpoints and/or other endpoints.

Once the emulated site adequately passes the tests, an automated deployment process 612 may be so informed, and the automated deployment process 612 may in response automatically deploy the software to the physical power plant site 614 (e.g., to the onsite EMS system 616) as authorized (e.g., immediately, at the next maintenance window, other schedule time). Optionally, the software deployment may be performed manually, in response to a user ae present disclosure relates to an energy management system whose functionality can be dynamically shifted from a local computer system to a cloud system.

Optionally, the same test scenarios and test inputs (e.g., test commands and/or use cases) used to test and validate the digital model of the power plant site equipment may be used to test and validate the actual power plant site equipment, thereby greatly speeding up the process of validating the operation of the actual power plant site equipment.

As similarly discussed elsewhere herein, the test inputs may comprise predefined input scenarios or data sets (e.g., energy demand profiles, grid failure scenarios, temperatures, and/or the like) that represent real-world conditions under which the power plant site equipment will operate. The test inputs can be applied to the actual power plant site equipment where both the model and the system behave similarly under the same input conditions. In particular, the underlying logic, control algorithms, and/or functional specifications of the model may be configured to match the actual power plant site equipment implementation. This ensures that the test inputs are valid for both environments.

For example, testing a power plant may involve using a variety of inputs to simulate real-world operational conditions, stress situations, failures, and/or environmental changes. These test inputs help validate that the plant's systems (control, electrical, mechanical, software, and/or the like) can handle different operational scenarios and meet performance, safety, and reliability standards. Following are further examples of optional test inputs that may be used to test and validate a power plant power plant model.

Load Demand Inputs: Inputs representing simulated changes in power demand over time. Load demand inputs test the plant's ability to handle varying load conditions. For example, the load demand inputs may include normal load variations (e.g., normal low, medium, high demand periods) and/or sudden peaks in demand (e.g., grid demand spikes). Testing using load demand test inputs validates that the power plant can adjust its output based on grid demand efficiently and without stability issues.

Fuel Inputs: Inputs representing simulated variations in fuel type, quality, and/or availability for fuel-dependent plants (e.g., coal, natural gas, or biomass plants). The fuel inputs may be utilized to simulate changes in fuel supply (e.g., variation in gas supply pressure, coal quality, intermittent fuel supply, and/or the like). The fuel test input enables the testing of fuel handling, efficiency, and/or combustion systems under different fuel conditions.

Grid Frequency and Voltage Inputs: Inputs representing simulated changes in grid frequency and voltage that the plant needs to respond to. The grid frequency and voltage inputs may include a sudden drop or rise in grid frequency, a voltage sag or swell on the grid, and/or the like. The grid frequency and voltage inputs may be varied together or separately. The grid frequency and voltage test inputs enable the plant's ability to regulate voltage and/or frequency to be tested and validated, ensuring stability in the broader grid.

Environmental Conditions: Inputs representing simulated environmental changes (e.g., temperature, humidity, and/or cooling water availability). For example, the test inputs may simulate ambient temperature fluctuations (e.g., extreme heat or cold), and/or water scarcity for cooling (e.g., as may occur in drought scenarios). Such simulated environmental conditions may be utilized to assess how well the plant's systems, such as cooling towers and heat exchangers, adapt to different environmental conditions.

Equipment Failure Scenarios: Inputs representing simulated failures in power plant equipment (e.g., turbines, boilers, transformers, generators, and/or the like). For example, the equipment failure test inputs may simulate turbine malfunction (e.g., simulating vibration or mechanical issues), generator or transformer trip due to overload, and/or the like. Such simulated equipment failure test inputs may enable the plant's fault detection, isolation, and/or recovery systems to be validated and may be utilized to ensure safety protocols activate correctly during failures.

Start-up and Shut-down Sequences: Inputs configured to test the proper sequence and timing for starting up or shutting down the plant (e.g., cold-start test where the plant is started from a complete shutdown).

Emergency shut-down scenario due to grid failure: Inputs configured to test the start-up/shut-down procedures and ensure they occur safely and efficiently, minimizing stress on equipment.

Renewable Energy Inputs: Inputs simulating the integration of renewable energy sources such as wind or solar power (e.g., sudden increase or decrease in wind power generation, gradual increase or decrease in solar power generation to simulate changing cloud cover). Such simulations test the plant's ability to balance intermittent renewable energy inputs with stable baseload generation, when the plant is a hybrid plant setup combining carbon based energy and renewable energy.

Operational Control Inputs: Inputs that test the operational control of the plant (e.g., turbine speed control, boiler pressure control, generator synchronization, and/or the like). By way of illustrative example, operational control inputs may be used to simulate adjusting turbine speed in response to load changes or to simulate managing steam pressure in the boiler for optimal power output. Such simulations may be utilized to verify that control systems respond accurately and consistently to operational changes.

Cybersecurity and Network Inputs: Inputs that simulate cybersecurity threats or network interruptions to test the plant's digital resilience (e.g., network attacks such as Distributed Denial of Service (DDoS), unauthorized access attempts on control systems, and/or the like). Such simulations may be utilized to test the cybersecurity measures in place and ensure that plant control systems are protected from cyberattacks.

Safety System Inputs: Inputs that simulate emergency or hazardous conditions to test safety protocols (e.g., automatic shutdowns, fire suppression, pressure release systems, and/or the like). For example, a test input may simulate an excessive boiler pressure to determine if it triggers a safety release valve. By way of further example, a test input may simulate a fire alarm signal indicating the presence of a fire in a critical area to verify that safety systems respond correctly (e.g., an automatic shutdown). Such simulations may be utilized to verify safety mechanisms are triggered correctly and the plant can respond to emergencies.

Dynamic Grid Response Inputs: Inputs that simulate grid disturbances or dynamic grid response scenarios to evaluate how well the plant integrates with the grid. For example, a test input may be utilized to test black-start capability in response to a simulated total grid outage. By way of further example, a test input may be utilized to test load-shedding scenarios where the plant needs to rapidly reduce output. Such simulations may be utilized to test and verify the plant's grid response functionality and its ability to assist in grid recovery or balance during dynamic conditions.

Maintenance and Degradation Inputs: Inputs that simulate long-term wear, tear, and maintenance conditions. For example, a test input may simulate the effect of turbine degradation on performance after prolonged use. By way of further example, a test input may test how the plant responds during scheduled maintenance and partial shutdowns. By way of additional example, a test input may test how the plant responds to degradation in battery cell performance and/or to degradation in performance of a group of battery cells by simulating such degradation. For example, as a battery cell degrades, its internal resistance may increase, it may exhibit more pronounced voltage drop-off under load, its Coulombic efficiency (which measures how much charge is retrieved from the battery compared to how much is put in during charging) may decrease, it may exhibit abnormal thermal behavior (e.g., increased heat generation during charging or discharging relative to a baseline non-degraded cell), and/or the like.

Weather and Climate Scenarios: Inputs that simulate the impact of weather and climate events such as storms, floods, and heatwaves. For example, simulated rain or water detection device signals may be utilized to verify the plants response to extreme rainfall which may cause cooling water contamination. By way of further example, simulated temperature sensor test inputs may be utilized to simulate a heatwave and to determine the plant's cooling system response. Such simulations may be utilized to test and verify the plant's ability to operate under adverse weather conditions and execute the correct emergency procedures.

Backup Power and Energy Storage Inputs: Inputs that test the plant's ability to manage backup power systems or energy storage integration. For example, test inputs may be used to simulate a grid failure to verify that backup generators are activated. By way of further example, test inputs may be used to test battery storage systems in a hybrid power plant. By way of additional example, test inputs may be used to test and verify the plant's capability to maintain power output in emergencies or during fluctuations in power generation.

Thus, the test of the actual power plant and the power plant model may comprise numerous different types of test inputs, enabling the testing and performance verification of electrical, mechanical, operational, environmental, and/or cybersecurity aspects. The test inputs may be configured to simulate different real-world conditions, failure scenarios, and/or operational challenges to validate the plant's performance and its ability to maintain safe, reliable, and efficient operation under various circumstances.

Where the model simulates power distribution, voltage regulation, and/or load balancing, the test inputs used to assess these features in the model can be directly applied to the real power plant site equipment to see if the same behaviors are produced. This greatly reduces the time needed to validate the real power plant site equipment as new test inputs do not have to be created, and because the performance/response of the real power plant site equipment in response to the test inputs can be directly compared to corresponding performance/response of the power plant site equipment model. Where there is a difference between the performance/response of the real power plant site equipment and the power plant site equipment model exceeds certain thresholds, a determination may be made that the real power plant site equipment is not functioning properly and/or that the power plant site equipment model is not performing an accurate emulation of the physical power plant.

The format of test inputs may be configured to be compatible with both the model and the real system. For example, if the test inputs are time-series data representing load demand, they may be formatted in the same way (e.g., using PSS/E RAW Files (Power System Simulation), PSCAD (Power Systems Computer-Aided Design) data formats, Supervisory Control and Data Acquisition (SCADA) data formats, FMU Files (Functional Mock-up Units), CSV (comma-separated values) files, MATLAB files, TXT files, JSON, XLS files, Simulation Input Scripts, executable code (e.g., Python code), web services (e.g., SOAP (Simple Object Access Protocol), REST (Representational State Transfer)), Modbus, CAN (Controller Area Network), DNP3 (Distributed Network Protocol 3), PROFINET (Process Field Network), RTU (Remote Terminal Network), RS485 serial interface, real-time telemetry) for both the model and actual power plant site equipment.

For example, test inputs, such as energy demand profiles or grid failure scenarios, may be structured in a way that both the model and the physical system can process the test inputs. The test inputs may be entered via a file interface, a user interface, an API, and/or otherwise.

By ensuring that the test vectors are properly formatted and aligned with both the model's logic and the actual system's operational characteristics, the same test inputs can be effectively reused.

Figure 7:
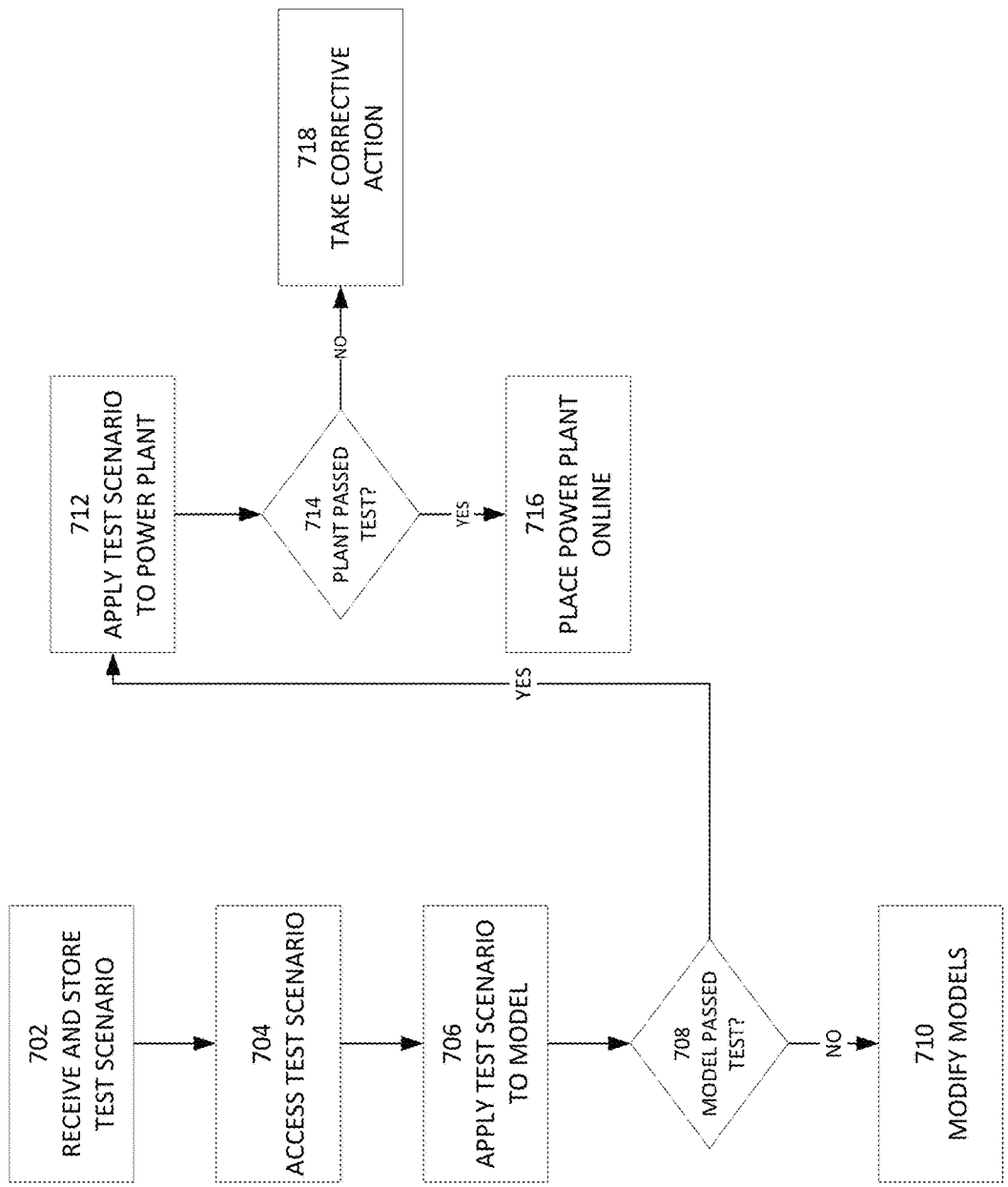
FIG. 7 illustrates an example test process.

FIG. 7 illustrates an example test process, wherein the same test inputs are used for first testing a power plant model, and then used for testing a physical, actual power plant (or selected portions thereof). This process quickly reduces the time it takes to test and validate a power plant and to bring it online.

Figure 8A:
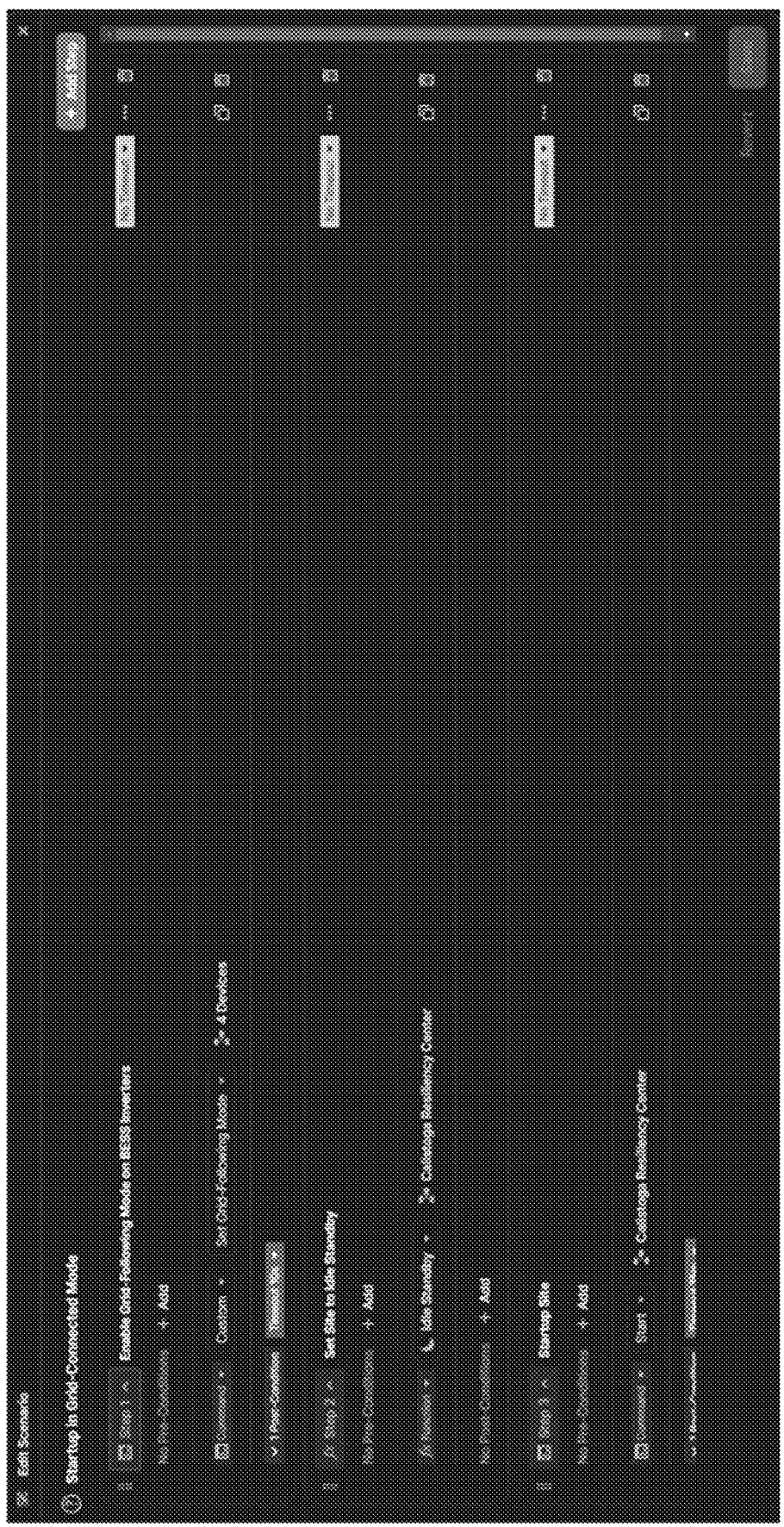
FIGS. 8A, 8B illustrate example test user interfaces.

At block 702, test scenario specifications are received (e.g., via a user interface from a user) and stored. The test scenarios may include some or all of the example scenarios and test inputs described herein. FIG. 8A illustrates an example test scenario specification user interface. As illustrated, the example user interface comprises fields that enable a user to specify various test steps, pre-conditions, post-conditions, functions, timings, and/or the like. A pre-condition is a state prior to a test operation, and a post-condition is a state after a test operation. For example, a pre-condition with respect to a breaker may be "breaker open" and a post-condition with respect to the breaker may be "breaker closed".

Figure 8B:
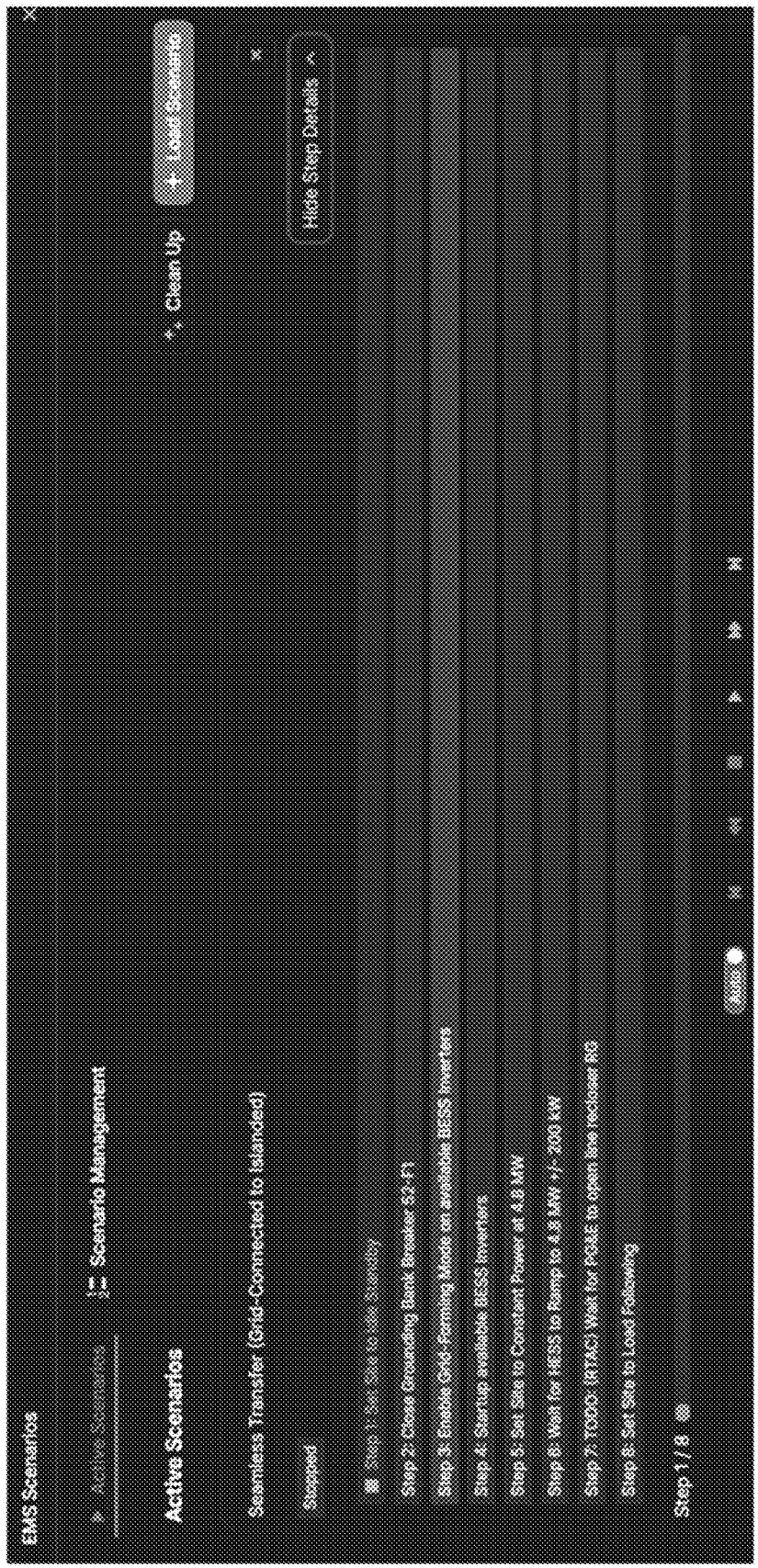

At block 704, the stored test scenario may be selected and accessed from memory. FIG. 8B illustrates an example user interface that lists example test steps and corresponding descriptions for a given scenario (e.g., set site to idle standby, close grounding bank breakers, enable grid forming mode on available inverters, set site to a specified constant power, wait to ramp up to specified wattage, wait for line recloser to be opened, set site to load, and/or the like). The user interface includes a control that enables, upon activation, a selected test scenario to be loaded.

At block 706, the selected test scenario, comprising corresponding test inputs, may be applied to a digital power plant model, such as the digital twin discussed herein. At block 708, a determination is made as to whether the model passed the test. For example, the model outputs (e.g., operating parameter values) may be compared to corresponding expected values (e.g., accessed from memory) and if the model outputs correspond to/sufficiently match the expected values (e.g., match the expected values or are within a threshold difference from the expected values) then it may be determined that the model passed the test.

If the model did not pass the test, at block 710, the model may be modified to better provide the expected outputs, and the test may be conducted again. For example, the process may determine how and where the model's behavior deviated from the expected performance (e.g., a mismatch in data outputs, failure to simulate operational conditions correctly, poor response to faults, and/or the like). The error may be classified as being due to incorrect input data, inaccurate algorithms, issues in the model's physics (thermal, electrical, mechanical), and/or the like.

In order to resolve the errors that caused the mismatch, the data fed into the model (e.g., sensor readings, operational parameters, and/or the like) may be inspected to ensure that they are accurate and reflect the real-world conditions and if not, they may be corrected. Assumptions used in the model (e.g., equipment specifications, operational limits, plant configurations, and/or the like) may be analyzed to ensure they are correct, and if not, they may be corrected.

The algorithms used in the model (e.g., thermodynamic calculations, electrical simulation, and/or the like) may be analyzed to ensure they correctly reflect the power plant's processes, and if not, they may be corrected.

Parameter tuning may be performed to better calibrate the model. For example, model parameters may be adjusted to ensure they better match real-world data or test conditions (e.g., fine-tuning values such as efficiency factors, thermal dynamics, and/or response times).

Historical data from the power plant may be utilized to determine if the corrected parameters provide more accurate predictions.

If the model did pass the test, at block 712 the same test scenario and test inputs may be applied to the actual, physical power plant (or a portion thereof). At block 714, a determination is made as to whether the actual, physical power plant passed the test. For example, the physical power plant outputs (e.g., operating parameter values) may be compared to corresponding expected values (e.g., those generated by the model from the same test scenario test inputs or otherwise determined) and if the physical power plant outputs correspond to the expected values (e.g., match the expected values or are within a threshold difference from the expected values), then it may be determined that the physical power plant passed the test.

If the physical power plant did not pass the test, at block 718 the physical power plant may be subject to corrective action (e.g., a component replaced or adjusted, new components added, and/or the like), and the test of the physical power plant may be conducted again. If the physical power plant did pass the test, at block 716 the physical power plant may be placed on line, and used to provide power to loads (e.g., a power grid).

Thus, an aspect of the present disclosure relates to a site energy management system that can dynamically be adapted to different energy sources, including battery and hydrogen energy sources, and that can switch from one energy source to another in the event of a failure. Another aspect of the present disclosure relates to methods for testing a site energy management system via a digital model of the site energy management system. Yet another aspect of the present disclosure relates to a site energy management system whose functionality can be dynamically shifted from a local computer system to a cloud system. Still another aspect of the present disclosure relates to various failover mechanisms that enhance site availability. Another aspect of the present disclosure relates to the use of interface module libraries to reduce the need to constantly rewrite interface module code to accommodate multiple versions of a device.

An aspect of the present disclosure relates to an example energy management system and methods of using the same. The energy management system is configured to deploy a first instantiation of a first hardware driver at a first electronic control device collocated with a first power plant apparatus, wherein the first hardware driver is configured to communicate with and enable control of the first power plant apparatus. The energy management system is configured to detect that the first instantiation of the first hardware driver at the first electronic control device has failed, and at least partly in response to detecting that the first instantiation of the first hardware driver at the first electronic control device has failed, utilize a second instantiation of the first hardware driver, stored in memory remote from the first electronic control device, to enable control of the first power plant apparatus.

Another aspect of the present disclosure relates to an energy management system, comprising: a network interface; at least one processing device operable to: deploy a first instantiation of a first hardware interface module at a first electronic control device collocated with a first power plant apparatus, wherein the first hardware interface module is configured to communicate with and enable control of the first power plant apparatus; detect that the first instantiation of the first hardware interface module at the first electronic control device has failed; at least partly in response to detecting that the first instantiation of the first hardware interface module at the first electronic control device has failed, utilize a second instantiation of the first hardware interface module, stored in memory remote from the first electronic control device, to enable control of the first power plant apparatus via the network interface.

Optionally, the first power plant apparatus, the first electronic control device, and the memory remote from the first electronic control device, are located at a first power plant site, wherein the at least one processing device is operable to: enable a third instantiation of the first hardware interface module, hosted by a cloud-based computer system remote from the first power plant site, to enable control of the first power plant apparatus at least partly in response to a failure of the first instantiation of the first hardware interface module and a failure of the second instantiation of the first hardware interface module. Optionally, the memory remote from the first electronic control device comprises memory of a second electronic control device. Optionally, there are a plurality of instantiations of the first hardware interface module stored in memory of a plurality of electronic control devices, wherein the second instantiation of the first hardware interface module is selected to enable control of the first power plant apparatus based at least in part on its proximity to the first power plant apparatus. Optionally, the second instantiation of the first hardware interface module is maintained in hot standby or on-demand mode. Optionally, the first power plant apparatus comprises a battery or an inverter. Optionally, a plurality of versions of the first electronic control device are located at a first power plant site, wherein the at least one processing device is operable to: select from a plurality of versions of hardware interface modules stored in memory, the plurality of versions of hardware interface modules configured for respective versions of the first electronic control device, an appropriate version of the hardware device interface module for a first version of the first electronic control device; and deploy the appropriate version of the hardware device interface module for the first version of the first electronic control device to the first version of the first electronic control device. Optionally, the first electronic control device comprises a programmable logic controller. Optionally, the first instantiation of the first hardware interface module failed as a result of a failure of the first electronic control device. Optionally, the second instantiation of the first hardware interface module is maintained in hot backup execution mode.

Another aspect of the present disclosure relates to an energy management system, comprising: a network interface; at least one processing device operable to: deploy a first instantiation of a first hardware interface module at a first electronic control device collocated with a first power plant apparatus, wherein the first hardware interface module is configured to communicate with and enable control of the first power plant apparatus; detect that the first instantiation of the first hardware interface module at the first electronic control device has failed; at least partly in response to detecting that the first instantiation of the first hardware interface module at the first electronic control device has failed, utilize a second instantiation of the first hardware interface module, stored in memory, to enable control of the first power plant apparatus via the network interface.

Optionally, the first power plant apparatus, the first electronic control device, and the memory, are located at a first power plant site, wherein the at least one processing device is operable to: enable a third instantiation of the first hardware interface module, hosted by a cloud-based computer system remote from the first power plant site, to enable control of the first power plant apparatus at least partly in response to a failure of the first instantiation of the first hardware interface module and a failure of the second instantiation of the first hardware interface module. Optionally, the memory comprises memory of a second electronic control device. Optionally, the memory comprises memory of a second electronic control device collocated with the first electronic device. Optionally, the memory comprises memory of a second electronic control device remote from the first electronic device. Optionally, there are a plurality of instantiations of the first hardware interface module stored in memory of a plurality of electronic control devices, wherein the second instantiation of the first hardware interface module is selected to enable control of the first power plant apparatus based at least in part on its proximity to the first power plant apparatus. Optionally, the second instantiation of the first hardware interface module is maintained in hot standby or on-demand mode. Optionally, the first power plant apparatus comprises a battery or an inverter. Optionally, a plurality of versions of the first electronic control device are located at a first power plant site, wherein the at least one processing device is operable to: select from a plurality of versions of hardware interface modules stored in memory, the plurality of versions of hardware interface modules configured for respective versions of the first electronic control device, an appropriate version of the hardware device interface module for a first version of the first electronic control device; and deploy the appropriate version of the hardware device interface module for the first version of the first electronic control device to the first version of the first electronic control device. Optionally, the first electronic control device comprises a programmable logic controller. Optionally, the first instantiation of the first hardware interface module failed as a result of a failure of the first electronic control device.

Another aspect of the present disclosure relates to systems and methods for testing a power plant emulation. Software for an energy management system is deployed to a computer system comprising computing devices. A model of a power plant site is deployed to a test framework. Test commands and/or use cases are injected, via the test framework to public energy management system end points. The test commands and/or use cases are used to emulate and test the model of at least the portion of the power plant site and to generate simulated operating parameter values. The generated simulated operating parameter values of the model are compared with expected values. A determination is made as to whether the model passed testing using the comparison. After determining the model passed testing, software, corresponding to at least a portion of the model, is made available for deployment to operate a physical version of the power plant site.

Another aspect of the present disclosure relates to a computer-implemented method of testing a power plant emulation, the method comprising: deploying software of an energy management system to a computer system comprising one or more computing devices; deploying a model of at least a portion of a power plant site to a test framework; injecting, via the test framework, test commands and/or use cases to public endpoints of the energy management system; using the test commands and/or use cases to emulate and test the model of at least the portion of the power plant site and to generate simulated operating parameter values; comparing the generated simulated operating parameter values of the model with expected values; determining whether the model passed testing based at least in part on the comparison of the generated simulated operating parameter values of the model with the expected values; and at least partly in response to determining the model passed testing, automatically make software, corresponding to at least a portion of the model, available for deployment to operate a physical version of the power plant site.

Optionally, the model comprises a digital twin with respect to at least a portion of physical equipment at the power plant, the digital twin having a software interface indistinguishable from software interfaces of corresponding physical equipment. Optionally, the public endpoints of the energy management system comprise data acquisition endpoints configured to collect data from sensors at the power plant site. Optionally, the model of at least the portion of a power plant site is specified via a site configuration registry that defines a power plant apparatus, electrical connections between the power plant apparatus, and apparatus limits. Optionally, the model of at least a portion of the power plant site is specified via a site configuration registry, the method further comprising, at least partly in response to determining the model passed testing, deploying the site configuration registry to the physical version of the power plant site. Optionally, the software, corresponding to at least a portion of the model, is deployed to operate the physical version of the power plant site during a maintenance window. Optionally, the software, corresponding to at least a portion of the model, is deployed to operate the physical version of the power plant site substantially immediately after being made available for deployment. Optionally, the model comprises models of battery energy storage system, a power conditioning system, a meter, and a power breaker.

Another aspect of the present disclosure relates to computer-implemented method of testing a power plant emulation, the method comprising: deploying software for an energy management system to a computer system comprising one or more computing devices; deploying a model of at least a portion of a power plant site to a test framework; injecting, via the test framework, test commands and/or use cases to public endpoints of the energy management system; using the test commands and/or use cases to emulate and test the model of at least the portion of the power plant site and to generate simulated operating parameter values; comparing the generated simulated operating parameter values of the model with expected values; determining whether the model passed testing based at least in part on the comparison of the generated simulated operating parameter values of the model with the expected values; and at least partly in response to determining the model passed testing, performing a first action.

Optionally, the model comprises a digital twin with respect to at least a portion of physical equipment at the power plant, the digital twin having respective software interfaces indistinguishable from software interfaces of corresponding physical equipment. Optionally, the public endpoints of the energy management system comprise data acquisition endpoints configured to collect data from sensors at the power plant site. Optionally, the model of at least the portion of a power plant site is specified via a site configuration registry that defines a power plant apparatus, electrical connections between the power plant apparatus, and apparatus limits. Optionally, the model of at least a portion of the power plant site is specified via a site configuration registry, the method further comprising, at least partly in response to determining the model passed testing, deploying the site configuration registry to a physical version of the power plant site. Optionally, software, corresponding to at least a portion of the model, is deployed to operate a physical version of the power plant site during a maintenance window. Optionally, software, corresponding to at least a portion of the model, is deployed to operate a physical version of the power plant site substantially immediately after being made available for deployment. Optionally, the model comprises models of battery energy storage system, a power conditioning system, a meter, and a power breaker.

Another aspect of the present disclosure relates to a non-transitory, tangible, computer readable memory that stores program instructions that when executed by a computer system comprising a computing device, cause the computer system to perform operations comprising: deploying software for an energy management to a computer system comprising one or more computing devices; deploying a model of at least a portion of a power plant site to a test framework; injecting, via the test framework, test commands and/or use cases to public endpoints of the energy management system; using the test commands and/or use cases to emulate and test the model of at least the portion of the power plant site and to generate simulated operating parameter values; comparing the generated simulated operating parameter values of the model with expected values; determining whether the model passed testing based at least in part on the comparison of the generated simulated operating parameter values of the model with the expected values; and at least partly in response to determining the model passed testing, performing a first action.

Optionally, the model comprises a digital twin with respect to at least a portion of physical equipment at the power plant, the digital twin having respective software interfaces indistinguishable from software interfaces of corresponding physical equipment. Optionally, the public endpoints of the energy management system comprise data acquisition endpoints configured to collect data from sensors at the power plant site. Optionally, the model of at least the portion of a power plant site is specified via a site configuration registry that defines a power plant apparatus, electrical connections between the power plant apparatus, and apparatus limits. Optionally, the model of at least a portion of the power plant site is specified via a site configuration registry, the operations further comprising, at least partly in response to determining the model passed testing, deploying the site configuration registry to a physical version of the power plant site. Optionally, software, corresponding to at least a portion of the model, is deployed to operate a physical version of the power plant site during a maintenance window. Optionally, software, corresponding to at least a portion of the model, is deployed to operate a physical version of the power plant site substantially immediately after being made available for deployment. Optionally, the model comprises models of battery energy storage system, a power conditioning system, a meter, and a power breaker.

Another aspect of the present disclosure relates to an energy management system and methods of using the same. The energy management system is configured to distribute power plant tasks. Energy management system tasks are received at the energy management system. At least a portion of the received tasks are passed over a network from the energy management system to a power plant lead controller in a cluster of nodes, the cluster of nodes comprising electronic devices configured to control power plant equipment, the cluster of nodes comprising the power plant lead controller and a plurality of power plant follower controllers, the cluster of nodes configured to provide a plurality of combinations of redundancy to control power plant equipment. The power plant lead controller delegates, in real time, tasks to the plurality of power plant follower controllers. At least one of the cluster of nodes is configurable to be in hot standby mode.

Another aspect of the present disclosure relates to a computer-implemented method of distributing tasks at a power plant, the method comprising: receiving energy management system tasks at an energy management system; passing at least a portion of the received tasks over a network from the energy management system to a power plant lead controller in a cluster of nodes, the cluster of nodes comprising electronic devices configured to control power plant equipment, the cluster of nodes comprising the power plant lead controller and a plurality of power plant follower controllers, the cluster of nodes configured to provide a plurality of combinations of redundancy to control power plant equipment; and delegating, in real time, by the power plant lead controller, tasks to the plurality of power plant follower controllers, wherein at least one of the cluster of nodes, comprising the power plant lead controller and the plurality of power plant follower controllers, is configurable to be in hot standby mode.

Optionally, at least two power plant follower controllers are located at different physical locations at the power plant. Optionally, at least one node of the cluster of nodes is cloud-based. Optionally, at least one node of the cluster of nodes is located at a second power plant Optionally, one or more power plant follower controllers comprise microcontrollers configured with real time operating systems. Optionally, the tasks, delegated in real time by the power plant lead controller, comprise resource management tasks. Optionally, the tasks, delegated in real time by the power plant lead controller, comprise taking at least one power plant apparatus out of service. Optionally, method further comprises using cascading commands to propagate commands or actions from one node in the cluster to other nodes in a cascading manner. Optionally, the energy management system comprises a node configured to operate as a backup to the power plant lead controller. Optionally, the energy management system is configured to manage heterogeneous power sources. Optionally, the method further comprises communicating, by the energy management system, with one or more cluster nodes using an encryption protocol. Optionally, at least one cluster node comprises a server.

Optionally, the energy management system comprises containerized code configured to run on virtual machines. Optionally, the energy management system is cloud-based. Optionally, the energy management system is located at the power plant. Optionally, the energy management system is located at a second power plant.

Another aspect of the present disclosure relates to an energy management system, comprising: a network interface; at least one processing device operable to: receive energy management system tasks; pass at least a portion of the received tasks over a network via the network interface to a power plant lead controller in a cluster of nodes, the cluster of nodes comprising electronic devices configured to control power plant equipment, the cluster of nodes comprising the power plant lead controller and a plurality of power plant follower controllers, the cluster of nodes configured to provide a plurality of combinations of redundancy to control power plant equipment; and cause the power plant lead controller to delegate, in real time, tasks to the plurality of power plant follower controllers, wherein at least one of the cluster of nodes, comprising the power plant lead controller and the plurality of power plant follower controllers, is configurable to be in hot standby mode.

Optionally, at least two power plant follower controllers are located at different physical locations at the power plant. Optionally, at least one node of the cluster of nodes is cloud-based. Optionally, at least one node of the cluster of nodes is located at a second power plant. Optionally, the tasks, delegated in real time by the power plant lead controller, comprise resource management tasks. Optionally, cascading commands are used to propagate commands or actions from one node in the cluster to other nodes in a cascading manner. Optionally, a node is configured to operate as a backup to the power plant lead controller. Optionally, the energy management system is configured to manage heterogeneous power sources. Optionally, the energy management system is configured to communicate with one or more cluster nodes using an encryption protocol. Optionally, at least one cluster node comprises a server. Optionally, the system further comprises containerized code configured to run on virtual machines. Optionally, the energy management system is cloud-based. Optionally, the energy management system is located at the power plant. Optionally, the energy management system is located at a second power plant.

An aspect of the present disclosure relates to a computer-implemented method of testing a power plant emulation, the method comprising: deploying a power plant model configured to model at least a portion of a power plant site to a test framework; injecting, via the test framework, a first test scenario comprising a first set of test inputs in a first format configured to be used for testing both the power plant model and the at least portion of the power plant site, into the power plant model; accessing simulated operating parameter values generated by the power plant model; comparing the generated simulated operating parameter values of the power plant model with expected values; determining whether the power plant model passed testing based at least in part on the comparison of the generated simulated operating parameter values of the power plant model with the expected values; at least partly in response to determining that the power plant model passed testing, applying the first test scenario comprising the first set of test inputs in the first format to at least the portion of the power plant site; comparing operating parameter values from at least the portion of a power plant site to the simulated operating parameter values generated by the power plant model; at least partly in response to determining that the operating parameter values from at least the portion of a power plant site fail to sufficiently match the simulated operating parameter values generated by the power plant model, modify the power plant site.

Optionally, the power plant model comprises software interfaces indistinguishable from software interfaces of corresponding physical equipment of the power plant site. Optionally, the first format comprises a Power System Simulation file format, a Supervisory Control and Data Acquisition (SCADA) data format, a PSCAD (Power Systems Computer-Aided Design) data format, a Functional Mock-up Units (FMU) format, a CSV (comma-separated values) format, a MATLAB file format, a TXT file format, a JSON format, an XLS file format, a Simulation Input Scripts file format, executable code, a web service format, a REST (Representational State Transfer) format, a Modbus format, a CAN (Controller Area Network) format, a DNP3 (Distributed Network Protocol 3) format, a PROFINET (Process Field Network) format, an RTU (Remote Terminal Network) format, and/or a serial interface format. Optionally, the power plant model is specified via a site configuration registry, the method further comprising, at least partly in response to determining the power plant model passed testing, deploying the site configuration registry to the power plant site. Optionally, the first test scenario comprises a plurality of scenarios including: an emergency shut-down scenario, a scenario configured to test turbine speed control, boiler pressure control, and/or generator synchronization; a scenario configured to simulate cybersecurity threats comprising Distributed Denial of Service (DDoS) attacks and unauthorized access attempts of power plant control systems; a scenario configured to simulate emergency conditions to test safety protocols; a scenario configured to simulate grid disturbances; and a scenario configured to simulate a fire alarm signal. Optionally, the method further comprising causing a user interface to be rendered on a display, the user interface configured to display test steps and corresponding descriptions for the first test scenario. Optionally, the method further comprising causing a user interface to be rendered on a display, the user interface comprising fields that enable a user to specify test steps, pre-conditions, post-conditions, functions, and timings.

An aspect of the present disclosure relates to a system configured to test a power plant model and to test a power plant, the system comprising: a computer device; non-transitory, tangible computer readable memory having program instructions stored thereon that when executed by the computer device cause the system to perform operations comprising: inject, via a test framework, a first test scenario comprising a first set of test inputs in a first format configured to be used for testing both a power plant model and to test a corresponding power plant site, into the power plant model; access simulated operating parameter values generated by the power plant model; compare the generated simulated operating parameter values of the power plant model with corresponding expected values for the power plant model; determine whether the power plant model passed testing based at least in part on the comparison of the generated simulated operating parameter values of the power plant model with the corresponding expected values for the power plant model; at least partly in response to determining that the power plant model passed testing, apply the first test scenario comprising the first set of test inputs in the first format to the power plant site; compare operating parameter values from the power plant site to expected operating parameter values for the power plant site; and at least partly in response to determining that the operating parameter values from the power plant site fail to sufficiently match the expected operating parameter values for the power plant site, modify the power plant site.

Optionally, the power plant model comprises software interfaces indistinguishable from software interfaces of corresponding physical equipment of the power plant. Optionally, the first format comprises a Power System Simulation file format, a Supervisory Control and Data Acquisition (SCADA) data format, a PSCAD (Power Systems Computer-Aided Design) data format, a Functional Mock-up Units (FMU) format, a CSV (comma-separated values) format, a MATLAB file format, a TXT file format, a JSON format, an XLS file format, a Simulation Input Scripts file format, executable code, a web service format, a REST (Representational State Transfer) format, a Modbus format, a CAN (Controller Area Network) format, a DNP3 (Distributed Network Protocol 3) format, a PROFINET (Process Field Network) format, an RTU (Remote Terminal Network) format, and/or a serial interface format. Optionally, the power plant model is specified via a site configuration registry, wherein the system is configured to, at least partly in response to determining the power plant model passed testing, deploy the site configuration registry to the power plant site. Optionally, the first test scenario comprises a plurality of scenarios including: an emergency shut-down scenario, a scenario configured to test turbine speed control, boiler pressure control, and/or generator synchronization; a scenario configured to simulate cybersecurity threats comprising Distributed Denial of Service (DDoS) attacks and unauthorized access attempts of power plant control systems; a scenario configured to simulate emergency conditions to test safety protocols; a scenario configured to simulate grid disturbances; and a scenario configured to simulate a fire alarm signal. Optionally, the system is configured to cause a user interface to be rendered on a display, the user interface configured to display test steps and corresponding descriptions for the first test scenario. Optionally, the system is configured to cause a user interface to be rendered on a display, the user interface comprising fields that enable a user to specify test steps, pre-conditions, post-conditions, functions, and timings.

An aspect of the present disclosure relates to a non-transitory, tangible, computer readable memory that stores program instructions that when executed by a computer system comprising a computing device, cause the computer system to perform operations comprising: inject, via a test framework, a first test scenario comprising a first set of test inputs configured to be used for testing both a power plant model and to test a corresponding power plant site, into the power plant model; access simulated operating parameter values generated by the power plant model; compare the generated simulated operating parameter values of the power plant model with corresponding expected values for the power plant model; determine whether the power plant model passed testing based at least in part on the comparison of the generated simulated operating parameter values of the power plant model with the corresponding expected values for the power plant model; at least partly in response to determining that the power plant model passed testing, apply the first test scenario comprising the first set of test inputs to the power plant site; compare operating parameter values from the power plant site to expected operating parameter values for the power plant site; and at least partly in response to determining that the operating parameter values from the power plant site fail to sufficiently match the expected operating parameter values for the power plant site, modify the power plant site.

Optionally, the power plant model comprises software interfaces indistinguishable from software interfaces of corresponding physical equipment of the power plant. Optionally, the first test scenario comprising the first set of test inputs configured to be used for testing both the power plant model and to test the corresponding power plant site comprises test inputs in one or more of formats comprising: a Power System Simulation file format, a PSCAD (Power Systems Computer-Aided Design) data format, a Supervisory Control and Data Acquisition (SCADA) data format, a Functional Mock-up Units (FMU) format, a CSV (comma-separated values) format, a MATLAB file format, a TXT file format, a JSON format, XLS file format, a Simulation Input Scripts file format, executable code, a web service format, a REST (Representational State Transfer) format, a Modbus format, a CAN (Controller Area Network) format, a DNP3 (Distributed Network Protocol 3) format, a PROFINET (Process Field Network) format, an RTU (Remote Terminal Network) format, and/or a serial interface format. Optionally, the power plant model is specified via a site configuration registry, the operations further comprising: at least partly in response to determining the power plant model passed testing, deploy the site configuration registry to the power plant site. Optionally, the first test scenario comprises a plurality of scenarios including: an emergency shut-down scenario, a scenario configured to test turbine speed control, boiler pressure control, and/or generator synchronization; a scenario configured to simulate cybersecurity threats comprising Distributed Denial of Service (DDoS) attacks and unauthorized access attempts of power plant control systems; a scenario configured to simulate emergency conditions to test safety protocols; a scenario configured to simulate grid disturbances; and a scenario configured to simulate a fire alarm signal. Optionally, the operations further comprising: cause a user interface to be rendered on a display, the user interface configured to display test steps and corresponding descriptions for the first test scenario. Optionally, the operations further comprising: cause a user interface to be rendered on a display, the user interface comprising fields that enable a user to specify test steps, pre-conditions, post-conditions, functions, and timings. Optionally, the power plant model comprises models of battery energy storage system, a power conditioning system, a meter, and a power breaker.

An aspect of the present disclosure relates a computer-implemented method of distributing tasks at a power plant, the method comprising: distributing, by an energy management system configured to control components of a power plant to manage power output to a power grid, a control function across multiple nodes in a cluster of nodes, the cluster of nodes comprising electronic devices configured to control power plant components and configured to provide a plurality of combinations of redundancy to control power plant components, the cluster of nodes comprising at least a first node, a second node and a third node; designating, by the energy management system, the first node in the cluster of nodes as a lead controller, wherein the second node and the third node are designated as follower controllers; receiving energy management system tasks at the energy management system; passing at least a portion of the received tasks over a network from the energy management system to the first node in the cluster of nodes, the first node configured as the lead controller; delegating, in real time, by the first node configured as the lead controller, tasks, comprising at least a portion of the received tasks, to other nodes, configured as follower controllers, in the cluster of nodes; at least partly in response to detecting that the first node, configured as the lead controller, in the cluster of nodes is unavailable, executing a failover process comprising a cluster voting process, wherein nodes in the cluster of nodes vote for a new lead controller; and based at least in part on the voting process, enable the second node in the cluster of nodes to be designated as lead controller.

Optionally, the voting process comprises a Raft consensus voting process, a Paxos consensus voting process, a Multi-Paxos consensus voting process, a Bully voting process, a ZooKeeper Atomic Broadcast (ZAB) voting process, and/or a quorum-based voting process. Optionally, at least one node in the cluster of nodes at least partly bases its vote on a location of at least one other node. Optionally, at least one node in the cluster of nodes at least partly bases its vote on a communication latency. Optionally, at least one node in the cluster of nodes casts its vote to enhance load balancing. Optionally, at least one node of the cluster of nodes is cloud-based. Optionally, at least one node of the cluster of nodes is located at a second power plant. Optionally, one or more power plant follower controllers comprise a server and/or microcontrollers configured with real time operating systems. Optionally, the method further comprising using cascading commands to propagate commands or actions from one node in the cluster to other nodes in a cascading manner. Optionally, the energy management system comprises a node configured to operate as a backup to the first node.

An aspect of the present disclosure relates to a system, comprising: an energy management system comprising one or more computing devices, the energy management system configured to distribute a control function across multiple nodes in a cluster of nodes, the cluster of nodes comprising a plurality of nodes comprising electronic devices configured to control power plant equipment and configured to provide a plurality of combinations of redundancy to control power plant equipment, the plurality of cluster nodes comprising: at least a first cluster node designated as a lead controller, and a least a second cluster node and a third cluster node designated as follower controllers; wherein the system is configured to: receive energy management system tasks using the energy management system; pass at least a portion of the received tasks over a network from the energy management system to the first node in the cluster of nodes, the first node configured as the lead controller; delegate, in real time, using the first node configured as the lead controller, tasks, comprising at least a portion of the received tasks, to other nodes, configured as follower controllers, in the cluster of nodes; at least partly in response to at least one follower controller detecting that the first node, configured as the lead controller, in the cluster of nodes is unavailable, execute a failover process comprising a cluster voting process, wherein nodes in the cluster of nodes vote for a new lead controller; and based at least in part on the voting process, enable the second node in the cluster of nodes to be designated as lead controller.

Optionally, the voting process comprises a Raft consensus voting process, a Paxos consensus voting process, a Multi-Paxos consensus voting process, a Bully voting process, a ZooKeeper Atomic Broadcast (ZAB) voting process, and/or a quorum-based voting process. Optionally, at least one node in the cluster of nodes at least partly bases its vote on a location of at least one other node. Optionally, at least one node in the cluster of nodes at least partly bases its vote on a communication latency. Optionally, at least one node in the cluster of nodes casts its vote to enhance load balancing. Optionally, at least one node of the cluster of nodes is cloud-based. Optionally, at least one node of the cluster of nodes is located at a second power plant. Optionally, one or more power plant follower controllers comprise a server and/or microcontrollers configured with real time operating systems. Optionally, the cluster of nodes is configured to use cascading commands to propagate commands or actions from one node in the cluster to other nodes in a cascading manner. Optionally, the energy management system comprises a node configured to operate as a backup to the first node. Optionally, the energy management system is located at a second power plant.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of testing a power plant emulation, the method comprising:
   deploying a power plant model configured to model at least a portion of a power plant site to a test framework;
   injecting, via the test framework, a first test scenario comprising a first set of test inputs in a first communication protocol, the first communication protocol compatible with both the power plant model and the power plant site and configured to be used for testing both the power plant model and the at least portion of the power plant site, into the power plant model;
   accessing simulated operating parameter values generated by the power plant model;
   comparing the generated simulated operating parameter values of the power plant model with expected values;
   determining whether the power plant model passed testing based at least in part on the comparison of the generated simulated operating parameter values of the power plant model with the expected values;
   at least partly in response to determining that the power plant model passed testing, applying the first test scenario comprising the first set of test inputs in the first communication protocol to at least the portion of the power plant site;
   comparing operating parameter values from at least the portion of a power plant site to the simulated operating parameter values generated by the power plant model; and
   at least partly in response to validating the power plant site by determining that the operating parameter values from at least the portion of a power plant site sufficiently match the simulated operating parameter values generated by the power plant model, enabling the validated power plant to go commercially online.

2. The computer-implemented method of claim 1, wherein the power plant model comprises software interfaces indistinguishable from software interfaces of corresponding physical equipment of the power plant site.

3. The computer-implemented method of claim 1, wherein the first communication protocol comprises a Power System Simulation file format, a Supervisory Control and Data Acquisition (SCADA) data format, a PSCAD (Power Systems Computer-Aided Design) data format, a Functional Mock-up Units (FMU) format, a CSV (comma-separated values) format, a MATLAB file format, a TXT file format, a JSON format, an XLS file format, a Simulation Input Scripts file format, executable code, a web service format, a REST (Representational State Transfer) format, a Modbus format, a CAN (Controller Area Network) format, a DNP3 (Distributed Network Protocol 3) format, a PROFINET (Process Field Network) format, an RTU (Remote Terminal Network) format, and/or a serial interface format.

4. The computer-implemented method of claim 1, wherein the power plant model is specified via a site configuration registry, the method further comprising, at least partly in response to determining the power plant model passed testing, deploying the site configuration registry to the power plant site.

5. The computer-implemented method of claim 1, wherein the first test scenario comprises a plurality of scenarios including:
   an emergency shut-down scenario,
   a scenario configured to test turbine speed control, boiler pressure control, and/or generator synchronization;
   a scenario configured to simulate cybersecurity threats comprising Distributed Denial of Service (DDoS) attacks and unauthorized access attempts of power plant control systems;
   a scenario configured to simulate emergency conditions to test safety protocols;
   a scenario configured to simulate grid disturbances; and
   a scenario configured to simulate a fire alarm signal.

6. The computer-implemented method of claim 1, the method further comprising causing a user interface to be rendered on a display, the user interface configured to display test steps and corresponding descriptions for the first test scenario.

7. The computer-implemented method of claim 1, the method further comprising causing a user interface to be rendered on a display, the user interface comprising fields that enable a user to specify test steps, pre-conditions, post-conditions, functions, and timings.

8. A system configured to test a power plant model and to test a power plant, the system comprising:
   a computer device; and
   non-transitory, tangible computer readable memory having program instructions stored thereon that when executed by the computer device cause the system to perform operations comprising:
   inject, via a test framework, a first test scenario comprising a first set of test inputs in a first communication protocol configured to be used for testing both a power plant model and to test a corresponding power plant site, into the power plant model;
   access simulated operating parameter values generated by the power plant model;
   compare the generated simulated operating parameter values of the power plant model with corresponding expected values for the power plant model;
   determine whether the power plant model passed testing based at least in part on the comparison of the generated simulated operating parameter values of the power plant model with the corresponding expected values for the power plant model;

at least partly in response to determining that the power plant model passed testing, apply the first test scenario comprising the first set of test inputs in the first communication protocol to the power plant site;

compare operating parameter values from the power plant site to expected operating parameter values for the power plant site; and at least partly in response to validating the power plant site by determining that the operating parameter values from the power plant site sufficiently match the simulated operating parameter values generated by the power plant model, enable the validated power plant to go commercially online.

9. The system of claim 8, wherein the power plant model comprises software interfaces indistinguishable from software interfaces of corresponding physical equipment of the power plant.

10. The system of claim 8, wherein the first communication protocol comprises a Power System Simulation file format, a Supervisory Control and Data Acquisition (SCADA) data format, a PSCAD (Power Systems Computer-Aided Design) data format, a Functional Mock-up Units (FMU) format, a CSV (comma-separated values) format, a MATLAB file format, a TXT file format, a JSON format, an XLS file format, a Simulation Input Scripts file format, executable code, a web service format, a REST (Representational State Transfer) format, a Modbus format, a CAN (Controller Area Network) format, a DNP3 (Distributed Network Protocol 3) format, a PROFINET (Process Field Network) format, an RTU (Remote Terminal Network) format, and/or a serial interface format.

11. The system of claim 8, wherein the power plant model is specified via a site configuration registry, wherein the system is configured to, at least partly in response to determining the power plant model passed testing, deploy the site configuration registry to the power plant site.

12. The system of claim 8, wherein the first test scenario comprises a plurality of scenarios including:

an emergency shut-down scenario, a scenario configured to test turbine speed control, boiler pressure control, and/or generator synchronization;

a scenario configured to simulate cybersecurity threats comprising Distributed Denial of Service (DDoS) attacks and unauthorized access attempts of power plant control systems;

a scenario configured to simulate emergency conditions to test safety protocols;

a scenario configured to simulate grid disturbances; and a scenario configured to simulate a fire alarm signal.

13. The system of claim 8, wherein the system is configured to cause a user interface to be rendered on a display, the user interface configured to display test steps and corresponding descriptions for the first test scenario.

14. The system of claim 8, wherein the system is configured to cause a user interface to be rendered on a display, the user interface comprising fields that enable a user to specify test steps, pre-conditions, post-conditions, functions, and timings.

15. Non-transitory, tangible, computer readable memory that stores program instructions that when executed by a computer system comprising a computing device, cause the computer system to perform operations comprising:

inject, via a test framework, a first test scenario comprising a first set of test inputs in a first communication protocol configured to be used for testing both a power plant model and to test a corresponding power plant site, into the power plant model;

access simulated operating parameter values generated by the power plant model;

compare the generated simulated operating parameter values of the power plant model with corresponding expected values for the power plant model;

determine whether the power plant model passed testing based at least in part on the comparison of the generated simulated operating parameter values of the power plant model with the corresponding expected values for the power plant model;

at least partly in response to determining that the power plant model passed testing, apply the first test scenario comprising the first set of test inputs to the power plant site;

compare operating parameter values from the power plant site to expected operating parameter values for the power plant site; and at least partly in response to validating the power plant site by determining that the operating parameter values from the power plant site sufficiently match the simulated operating parameter values generated by the power plant model, enable the validated power plant to go commercially online.

16. The non-transitory, tangible, computer readable memory of claim 15, wherein the power plant model comprises software interfaces indistinguishable from software interfaces of corresponding physical equipment of the power plant.

17. The non-transitory, tangible, computer readable memory of claim 15, wherein the first test scenario comprising the first set of test inputs configured to be used for testing both the power plant model and to test the corresponding power plant site comprises test inputs in one or more of protocols comprising: a Power System Simulation file format, a PSCAD (Power Systems Computer-Aided Design) data format, a Supervisory Control and Data Acquisition (SCADA) data format, a Functional Mock-up Units (FMU) format, a CSV (comma-separated values) format, a MATLAB file format, a TXT file format, a JSON format, XLS file format, a Simulation Input Scripts file format, executable code, a web service format, a REST (Representational State Transfer) format, a Modbus format, a CAN (Controller Area Network) format, a DNP3 (Distributed Network Protocol 3) format, a PROFINET (Process Field Network) format, an RTU (Remote Terminal Network) format, and/or a serial interface format.

18. The non-transitory, tangible, computer readable memory of claim 15, wherein the power plant model is specified via a site configuration registry, the operations further comprising: at least partly in response to determining the power plant model passed testing, deploy the site configuration registry to the power plant site.

19. The non-transitory, tangible, computer readable memory of claim 15, wherein the first test scenario comprises a plurality of scenarios including:

an emergency shut-down scenario, a scenario configured to test turbine speed control, boiler pressure control, and/or generator synchronization;

a scenario configured to simulate cybersecurity threats comprising Distributed Denial of Service (DDoS) attacks and unauthorized access attempts of power plant control systems;

a scenario configured to simulate emergency conditions to test safety protocols;

a scenario configured to simulate grid disturbances; and a scenario configured to simulate a fire alarm signal.

20. The non-transitory, tangible, computer readable memory of claim 15, the operations further comprising: cause a user interface to be rendered on a display, the user interface configured to display test steps and corresponding descriptions for the first test scenario.

21. The non-transitory, tangible, computer readable memory of claim 15, the operations further comprising: cause a user interface to be rendered on a display, the user interface comprising fields that enable a user to specify test steps, pre-conditions, post-conditions, functions, and timings.

22. The non-transitory, tangible, computer readable memory of claim 15, wherein the power plant model comprises models of battery energy storage system, a power conditioning system, a meter, and a power breaker.

\* \* \* \* \*